(12) United States Patent
Duncan

(10) Patent No.: US 12,056,298 B1
(45) Date of Patent: Aug. 6, 2024

(54) METHOD AND APPARATUS FOR GREATER PRECISION IN TRACKING

(71) Applicant: Brandon Duncan, Dover, NH (US)

(72) Inventor: Brandon Duncan, Dover, NH (US)

( * ) Notice: Subject to any disclaimer, the term of this patent is extended or adjusted under 35 U.S.C. 154(b) by 0 days.

(21) Appl. No.: 18/581,639

(22) Filed: Feb. 20, 2024

(51) Int. Cl.
*G06F 3/038* (2013.01)
*G06F 3/0354* (2013.01)
*G06F 3/039* (2013.01)

(52) U.S. Cl.
CPC .......... *G06F 3/038* (2013.01); *G06F 3/03543* (2013.01); *G06F 3/039* (2013.01)

(58) Field of Classification Search
CPC ....... G06F 3/038; G06F 3/03543; G06F 3/039
See application file for complete search history.

(56) References Cited

U.S. PATENT DOCUMENTS

| | | | | |
|---|---|---|---|---|
| 6,264,272 B1* | 7/2001 | Jones | ...................... | A47C 7/705 297/173 |
| 11,150,748 B1* | 10/2021 | Tan | ........................ | G06F 3/0383 |
| 11,740,712 B1* | 8/2023 | Morier | .................... | G06F 3/038 345/163 |
| 2005/0218271 A1* | 10/2005 | Jang | ...................... | G06F 3/0395 248/118 |
| 2009/0146954 A1* | 6/2009 | Regen | ..................... | G06F 3/038 345/163 |
| 2015/0199005 A1* | 7/2015 | Haddon | .................. | G06F 3/013 345/163 |
| 2015/0331503 A1* | 11/2015 | Choi | .................... | G06F 3/03543 345/163 |
| 2016/0209941 A1* | 7/2016 | Hadas | ................. | G06F 3/03543 |
| 2017/0371436 A1* | 12/2017 | Kao | ..................... | G06F 3/03543 |
| 2018/0203530 A1* | 7/2018 | Lee | .......................... | G06F 3/017 |
| 2022/0031064 A1* | 2/2022 | Supriya | .................... | A47B 9/00 |
| 2024/0103643 A1* | 3/2024 | Sapp | ..................... | G06F 3/0346 |

* cited by examiner

*Primary Examiner* — Ariel A Balaoing
(74) *Attorney, Agent, or Firm* — Walter J. Tencza, Jr.

(57) ABSTRACT

An apparatus and method including a means for adjusting the angle of a pointing input device. The pointing input device relies on an input surface for the purpose of calculating cursor position. The means for adjusting the angle of the pointing input device may include computer software stored in a computer memory, and implemented by a computer processor. The computer software may provide suggested angle changes on the computer screen to improve input precision of the pointing input device. The computer software may be configured to implement the suggested angle changes, with the pointing device; and wherein after the suggested angle changes are implemented with the pointing input device, the computer software enables a user, through a user interactive device, to determine what affect the suggested angle changes had on accuracy of the pointing input device, through data displayed on the computer screen.

10 Claims, 20 Drawing Sheets

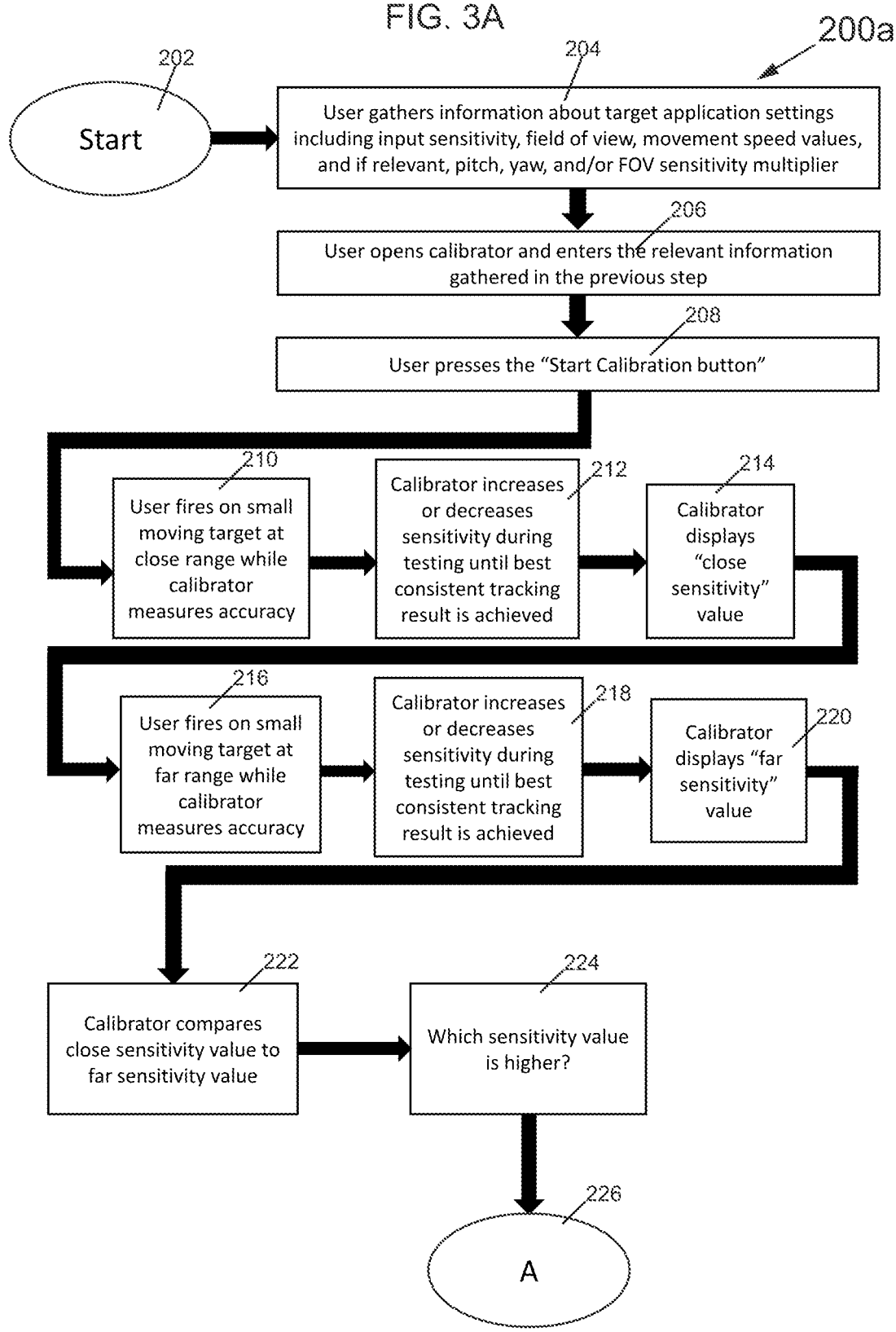

METHOD AND APPARATUS FOR GREATER PRECISION IN TRACKING

FIELD OF THE INVENTION

This invention relates devices for attempting to have greater precision in tracking operations on a computer screen as a result of interaction between a pointing input device, such as a computer mouse, and an input surface, such as a computer mousepad.

BACKGROUND OF THE INVENTION

In the present application, "input surface" is a surface that an input device makes contact with; and is used by the input device to calculate the position of a reference indicator (i.e. a mouse cursor or a game crosshair, hereby known as "cursor") on a computer screen as the input device is moved. A computer mousepad is a common example of an input surface. (Please note that almost any flat horizontal surface could functionally be used as an input surface, such as the surface of a desk.)

In the present application, "input device" refers to a physical device that a user uses to interact with computer software. There are many types of input devices, but the present application only references input devices that are "pointing input devices", other than a few references to keyboards, which are not pointing input devices. A computer mouse is a common example of a pointing input device. Though the concepts described in the present application would relate to any pointing input device that relies on the use of an input surface for calculation of cursor location and movement, for the sake of brevity, any further mention of a "pointing input device" will be referred to as a "mouse".

"Tracking" is the process of a user attempting to keep the cursor aligned with (or overlapping) a specific target in a software application, as that target moves and changes direction. Tracking accuracy can be expressed as a percentage, which is calculated by measuring how frequently the cursor stays in alignment with a target that is moving and changing direction. For any specified length of time divided into many intervals, a check is made at each interval to determine whether the cursor is aligned or not with the target. For example, if 25 seconds is divided into 100 intervals, and the cursor overlaps the target at 86 of those intervals, the tracking accuracy result would be 86%.

In a 3D (three dimensional) software application, the representation of the user (hereby known as the "avatar") could either be referred to as "the camera" in a first-person perspective software environment, or the user's "character" in a third-person perspective software environment. Objects that exist in the environment are often represented to be at different distances away from the avatar. Many applications will include reference markers (often as stripes on the ground labelled in 10-meter increments) to clarify how distances in the application are represented. These reference markers are often found in training sections of the application. For applications that don't include reference markers for distance, the size of the user's avatar can be used as the unit of measure. In most applications, an avatar is described to be approximately 2.0 meters tall, and the distance of objects would be expressed proportionally by how far away they appear from the avatar. One particular object may be 5.0 meters (2.5 character lengths) away from the avatar, while another object may appear to be 30.0 meters (fifteen character lengths) away, and a third object may be approximately 70.0 meters (thirty-five character lengths) away. In this example, the object at 5.0 meters would be described as being at "close range", the object at 30.0 meters would be at "medium range", and the object at 70.0 meters would be "far range".

Prior to the creation of the present invention, it was possible to adjust mouse settings in such a way that the user would be able to maintain accurate tracking at a certain range, but would almost always find difficulty in producing a similar level of accuracy when tracking at any ranges that were significantly closer or farther away. For example, the user may have adjusted the mouse settings to optimize the ability to track targets at medium range, but would then find that his/her accuracy suffered at both close and far ranges. The user may have then adjusted the mouse settings to improve close range accuracy, but would find that the medium range accuracy had decreased, and that the far range accuracy had been even further worsened. (This difficulty maintaining tracking accuracy also applies in both 2D (two dimensional) environments and 3D environments when a target changes position along the Y axis (moves higher or lower), or when the user begins tracking a new target that is on a different Y axis position (higher or lower) than the original target.)

Extreme input precision (hereby known as "precise aim") in 3D software space requires having a high percentage of tracking accuracy consistent across many ranges of targets, regardless of those targets' positions on the Y axis. Having precise aim in 2D software space requires having a consistent high percentage of accuracy for tracking targets, regardless of those targets' positions on the Y axis. In situations that require continuous accuracy in regard to cursor placement (such as when controlling expensive electronic equipment remotely or when playing competitive video games), the ability to consistently have precise aim across multiple ranges (or hypothetically, all ranges) would be a major advantage to a user.

Regarding mice and input surfaces, there are at least six factors that currently limit the possibility of precise aim in 2D and 3D computer software. At the time of the filing of the present application, two of these factors are widely known and understood by the mouse and input surface industry, and a third factor is known and at least somewhat understood. There are at least three factors that currently appear to not be understood to be a limitation to precise aim.

This is a list of those factors and how some affect the others.

(a) First factor: Materials, and the friction between surfaces. (This is an industry-known factor).

A mouse has points where it physically makes contact with the input surface. Depending on the material composition of that surface (cloth, glass, plastic, leather) and those of the mouse contact points (e.g. mouse feet or mouse skates, often made of plastic) and their current conditions (hot/cold, humidity/wetness), along with any external contaminants present (dust, sweat, skin particles), there will be differing levels of friction when the mouse is moved.

If an input surface does not provide very much friction, a mouse will not require much force to start moving or change direction. In this instance, the input surface is described to be "fast". If an input surface provides significant friction, a mouse will require significant force to start moving or change direction. In this instance, the input surface is described to be "slow".

To ensure that input precision is consistent, the input surface must be clean of contaminants, and must have at least all of the following properties:

(i) Durability—won't fray or degrade while being used; and (ii) Uniformity—the surface must have the same approximate friction at all points (iii) Humidity/Moisture resistance—if the material absorbs moisture, it will change the amount of resistance that the input surface provides.

In addition, in 3D space, when aiming at the longest ranges, having a textured input surface allows for fine adjustments that would be extremely difficult without tactile feedback from the input surface. The user can feel this input texture either as vibrations through the mouse as it moves, or by fingertips that directly touch the input surface.

If all other limiting factors have been accounted for and resolved/worked around, the most optimal input surface for most situations would be durable, uniform, and moisture resistant, and would be described as both textured and slow. This input surface would allow for fine grained adjustment in 3D aim when a target quickly and constantly changes directions.

(b) Second Factor—Multiplicative product of the mouse DPI setting ("DPI", which stands for "dots per linear inch" and is a measure of how many pixels the cursor moves per inch the actual mouse moves) and the sensitivity in the application ("sensitivity"), is often expressed as eDPI, which stands for "Effective Dots Per-inch". DPI values are generally set and/or modified in mouse software, or in a mouse driver interface. Most applications that rely on some level of input precision will have their own sensitivity setting (hereby known as "application sensitivity") that can be adjusted, either as a slider or a numerical value that can be typed in. DPI value multiplied by application sensitivity value equals eDPI value. (This is an industry known factor) For example, a DPI value of 800 with an application value of 4.21 would result in an eDPI of 3368. (Please note that eDPI only exists as a logical calculation, and thus, is not displayed anywhere and cannot be directly set anywhere. To raise eDPI, you would need to raise the mouse DPI value and/or the application sensitivity value. To lower eDPI, you would need to lower the mouse DPI value and/or the application sensitivity value.)

When eDPI values are changed, it affects the distance the mouse must be moved to have the cursor travel a set distance in a 2D or 3D space of a software application. If a mouse is physically moved a set distance, a higher eDPI value will cause the cursor to move farther than if a lower eDPI was used.

There is not a specific standard eDPI value or range that is universally considered to be the best in all situations. Different eDPI ranges are considered to be the most optimal in certain application types. In the example of computer games, tactical first-person perspective games often have slower movement and require a very slow, deliberate aiming style. The optimal eDPI range for many tactical first-person perspective games is often considered to be between 200 and 1000. In contrast, arena first-person perspective games often have much faster movement and require being able to react to opponents that suddenly appear behind the user. The optimal eDPI range for many arena first-person perspective games is often considered to be between 2500 and 7000.

(c) Third Factor—Weight of the mouse. (This seems to be somewhat understood by industry)

The weight of the mouse is an indirect factor whose largest impact is felt by how much force is required to initiate an abrupt change in direction of the mouse. The heavier a mouse, the more force it takes to start moving or change direction.

When used on an input surface that is "slow", the heavier a mouse is, the quicker it will come to a stop when movement force is reduced. When used on an input surface that is "fast", the heavier a mouse is, the more likely that momentum will keep the device moving when movement force is reduced, until eventually the friction of the input surface causes the mouse to come to a stop.

Generally speaking, a heavier mouse is considered less responsive than a lighter mouse because it takes additional force to initiate movement or direction changes in most situations, and it may situationally require additional force to make the device cease movement.

Conversely, a mouse that is too light may be considered to not have enough tactile feedback that the user would be able to intuitively estimate ("to feel") where the cursor should be at any given moment. This would lead to difficulty in maintaining tracking accuracy in situations where the target changes direction frequently.

For the most optimal aiming, a user should use the lightest mouse available that has enough weight to still provide tactile feedback.

There are three other factors that relate to precise aim, which do not appear to be currently understood, which is addressed in at least the summary and/or detailed description below related to the present invention.

SUMMARY OF THE INVENTION (d) A Fourth Factor related to precision of mouse on input surface, is: Height angle of the mouse as it relates to the user. This fourth factor could be expressed as "forward to backward tilt and/or left to right tilt" of a mouse (e.g. leaning a mouse forward or backward, and/or to the left or right side). (At the time of this filing, this factor does not appear to be understood by the industry and general public as a potential obstacle to mouse precision.)

This fourth factor is the primary limiting factor to aim precision that this present invention resolves in one or more embodiments.

In at least one embodiment of the present invention, an apparatus and/or a method is provided which comprises a means for adjusting the angle of a pointing input device with respect to a horizontal surface; and wherein the pointing input device relies on an input surface for the purpose of calculating cursor position.

The means for adjusting the angle of the pointing input device with respect to the horizontal surface may include computer software stored in a computer memory, and implemented by a computer processor.

The computer software stored in the computer memory, and implemented by the computer processor may provide suggested angle changes on the computer screen to improve input precision of the pointing input device.

The computer software may be configured to implement the suggested angle changes from the computer software, with the pointing device; and wherein after the suggested angle changes are implemented with the pointing input device, the computer software stored in the computer memory, and implemented by the computer processor enables a user, through a user interactive device, to determine what affect the suggested angle changes had on accuracy of the pointing input device, through data displayed on the computer screen.

In at least one embodiment, the computer software stored in the computer memory, and implemented by the computer processor generates targets at different positions on the computer screen.

In at least one embodiment, the computer software stored in the computer memory, and implemented by the computer processor produces additional sensitivity settings for improving accuracy of the pointing input device by creating an additional modifier to act along with manufacturer pointing input device DPI settings and manufacturer in-application sensitivities.

The computer software stored in the computer memory, and implemented by the computer processor may use a range of dots per inch (DPI) settings and provides suggested angle changes on the computer screen to improve input precision of the pointing input device.

The computer software stored in the computer memory, and implemented by the computer processor may use a range of computer software sensitivities and may provide suggested angle changes on the computer screen to improve input precision of the pointing input device.

In at least one embodiment, an apparatus is provided comprising a means for adjusting the angle of an input surface with respect to a horizontal surface; and wherein a pointing input device relies on the input surface for the purpose of calculating cursor position.

The means for adjusting the angle of the input surface with respect to the horizontal surface may include computer software stored in a computer memory, and implemented by a computer processor.

In at least one embodiment, the computer software stored in the computer memory, and implemented by the computer processor provides suggested angle changes on the computer screen to improve input precision of the pointing input device.

In at least one embodiment, the computer software stored in the computer memory is configured to implement the suggested angle changes with the input surface; and wherein after the suggested angle changes are implemented with the input surface, the computer processor enables a user, through a user interactive device, to determine what affect the angle suggested changes had on accuracy of the pointing input device, through data displayed on the computer screen.

The computer software stored in the computer memory, and implemented by the computer processor may generate targets at different positions on the computer screen.

The computer software stored in the computer memory, and implemented by the computer processor may produce additional sensitivity settings for improving accuracy of the pointing input device by creating an additional modifier to act along with manufacturer pointing input device DPI settings and manufacturer in-application sensitivities.

In at least one embodiment, the computer software stored in the computer memory, and implemented by the computer processor uses a range of dots per inch (DPI) settings and provides suggested angle changes on the computer screen to improve input precision of the pointing input device.

The computer software stored in the computer memory, and implemented by the computer processor may use a range of computer software sensitivities and provides suggested angle changes on the computer screen to improve input precision of the pointing input device.

In at least one embodiment, an apparatus is provided comprising a means for adjusting the angle of a horizontal surface with respect to a second horizontal surface; and wherein a pointing input device relies on an input surface for the purpose of calculating cursor position; and the input surface is physically supported by the first horizontal surface.

The means for adjusting the angle of the first horizontal surface with respect to the second horizontal surface may include computer software stored in a computer memory, and implemented by a computer processor.

The computer software stored in the computer memory, and implemented by the computer processor may provide suggested angle changes on the computer screen to improve input precision of the pointing input device.

The computer software stored in the computer memory may be configured to implement the suggested angle changes; and wherein after suggested angle changes are implemented with the first horizontal surface, the computer software stored in the computer memory, and implemented by the computer processor enables a user, through a user interactive device, to determine what affect the angle suggested changes had on accuracy of the pointing input device, through data displayed on the computer screen.

In at least one embodiment, an apparatus is provided comprising a means for adjusting the angle of a desk surface with respect to a horizontal surface; and wherein a pointing input device relies on an input surface for the purpose of calculating cursor position; and the desk surface physically supports the input surface.

The means for adjusting the angle of the desk surface with respect to the horizontal surface may include computer software stored in a computer memory, and implemented by a computer processor.

The computer software stored in the computer memory, and implemented by the computer processor may provide suggested angle changes on the computer screen to improve input precision of the pointing input device.

The computer software stored in the computer memory may be configured to implement the suggested angle changes with the desk surface; and wherein after suggested angle changes are implemented with the desk surface, the computer software stored in the computer memory, and implemented by the computer processor enables a user, through a user interactive device, to determine what affect the angle suggested changes had on accuracy of the pointing input device, through data displayed on the computer screen.

The computer software stored in the computer memory, and implemented by the computer processor may generate targets at different positions on the computer screen.

The computer software stored in the computer memory, and implemented by the computer processor may produce additional sensitivity settings for improving accuracy of the pointing input device by creating an additional modifier to act along with manufacturer pointing input device DPI settings and manufacturer in-application sensitivities.

The computer software stored in the computer memory, and implemented by the computer processor may use a range of computer software sensitivities and provide suggested angle changes on the computer screen to improve input precision of the pointing input device.

BRIEF DESCRIPTION OF THE DRAWINGS

FIG. 3A shows a first part of a second flow chart for a second method for use with the apparatus of FIG. 1 in accordance with an embodiment of the present invention;

DETAILED DESCRIPTION OF THE DRAWINGS

Figure 1:
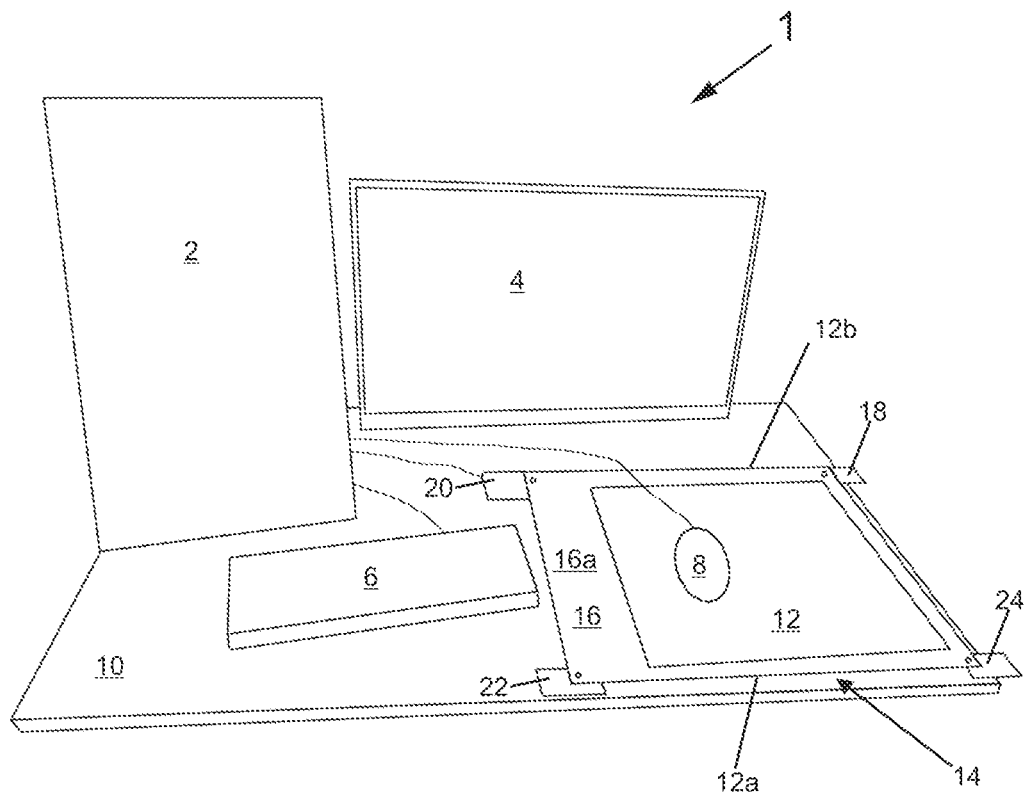
FIG. 1 shows a simplified perspective view of an apparatus in accordance with an embodiment of the present invention.

FIG. 1 shows a simplified perspective view of an apparatus 1 in accordance with an embodiment of the present invention.

The apparatus 1 includes a computer 2. The computer 2 typically includes at least a computer processor, computer memory, and one or more computer input/output ports for interacting with the internet and one or more peripheral devices. The computer 2 may be a personal computer.

The apparatus 1 further includes a computer monitor 4, a computer keyboard 6, a computer mouse 8, a table or supporting member 10, a computer mousepad 12, and a device 14. The device 14 includes a flat or substantially flat member or plate 16, having a top surface 16*a*, and support members 18, 20, 22, and 24, which are fixed beneath the member 16, such as by fasteners, glue, or in any other known manner.

The computer monitor 4, the computer keyboard 6, and the computer mouse 8 are connected by communication links to the computer 2 and/or to a computer processor of the computer 2, such as by wiring, wireless links or any other known communication links.

Figure 2:
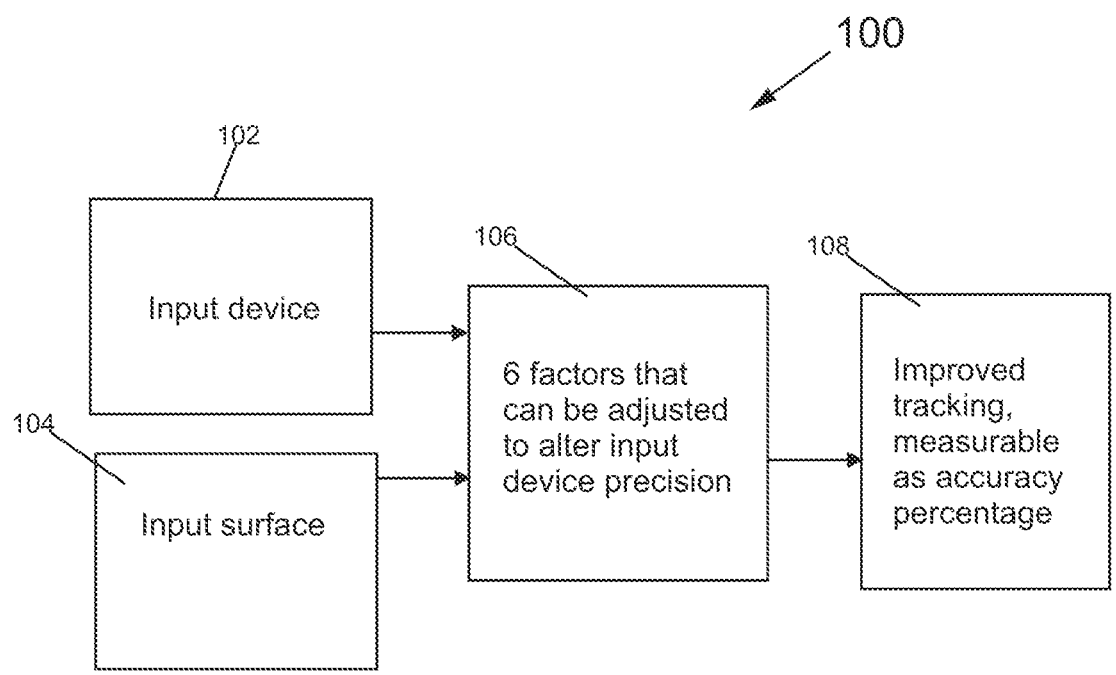
FIG. 2 shows a first flow chart of a first method for use with the apparatus of FIG. 1 in accordance with an embodiment of the present invention.

FIG. 2 shows a first flow chart 100 of a first method for use with the apparatus 1 of FIG. 1 in accordance with an embodiment of the present invention.

The first method of use shown by the first flow chart 100 includes step 102 where a mouse 8 provides one or more inputs, and step 104 an input surface 12 component provides one or more inputs to step 106. The inputs provided to step 106 include six factors that can be adjusted to alter input device precision. The first method shown by flow chart 100 further includes step 108, where mouse 8 precision, measurable as percentage of tracking accuracy is determined by the computer processor of the computer 2 and results are stored in computer memory of the computer 2.

FIG. 3A shows a first part 200*a* of a second flow chart for a second method for use with the apparatus 1 of FIG. 1 in accordance with an embodiment of the present invention.

The first part 200*a* includes step 202, which is the start of the second method.

At step 204, the user gathers information about the settings for the intended application, which is the software application that the user intends to improve tracking accuracy for. The user will retrieve the values for application sensitivity and field of view by checking the current values in the intended application. The user will also gather values for movement speed, pitch, yaw, and/or FOV sensitivity multiplier by reading through the application documentation, finding information about it on the software developer's website, or researching the topic on the internet.

At step 206, the user will enter values into the calibrator for application sensitivity, field of view, and movement speed. If pitch, yaw, and/or FOV sensitivity multiplier are determined by the user to be relevant in the intended application, the user will also enter these values into the calibrator.

At step 208, the user presses the Start Calibration button in the calibrator to begin the calibration process.

At step 210, in the three dimensional (3D) calibration software space, the calibrator measures tracking accuracy by having the user move the mouse 8 and hold down the specified mouse button to fire on a small moving target at close range, attempting to overlap the close target with the cursor as consistently as possible. This interaction with the cursor and target is shown on the monitor 4.

At step 212, the calibrator increases or decreases application sensitivity during testing until best consistent tracking result is achieved. This process is described in FIG. 12.

At step 214, the calibrator displays the "close application sensitivity" value in the calibration software interface on the monitor 4.

At step 216, in the three dimensional (3D) calibration software space, the calibrator measures tracking accuracy by having the user move the mouse 8 and hold down the specified mouse button to fire on a small moving target at far range, attempting to overlap the close target with the cursor as consistently as possible. This interaction with the cursor and target is shown on the monitor 4.

At step 218 the calibrator increases or decreases application sensitivity during testing until best consistent tracking result is achieved. This process is described in FIG. 12.

At step 220, the calibrator displays the "far application sensitivity" value in the calibration software interface on the monitor 4.

At step 222, the calibrator compares close application sensitivity value that was determined at step 214 to the far application sensitivity value that was determined at step 220.

At step 224, the calibrator determines which application sensitivity value is higher.

Figure 3B:
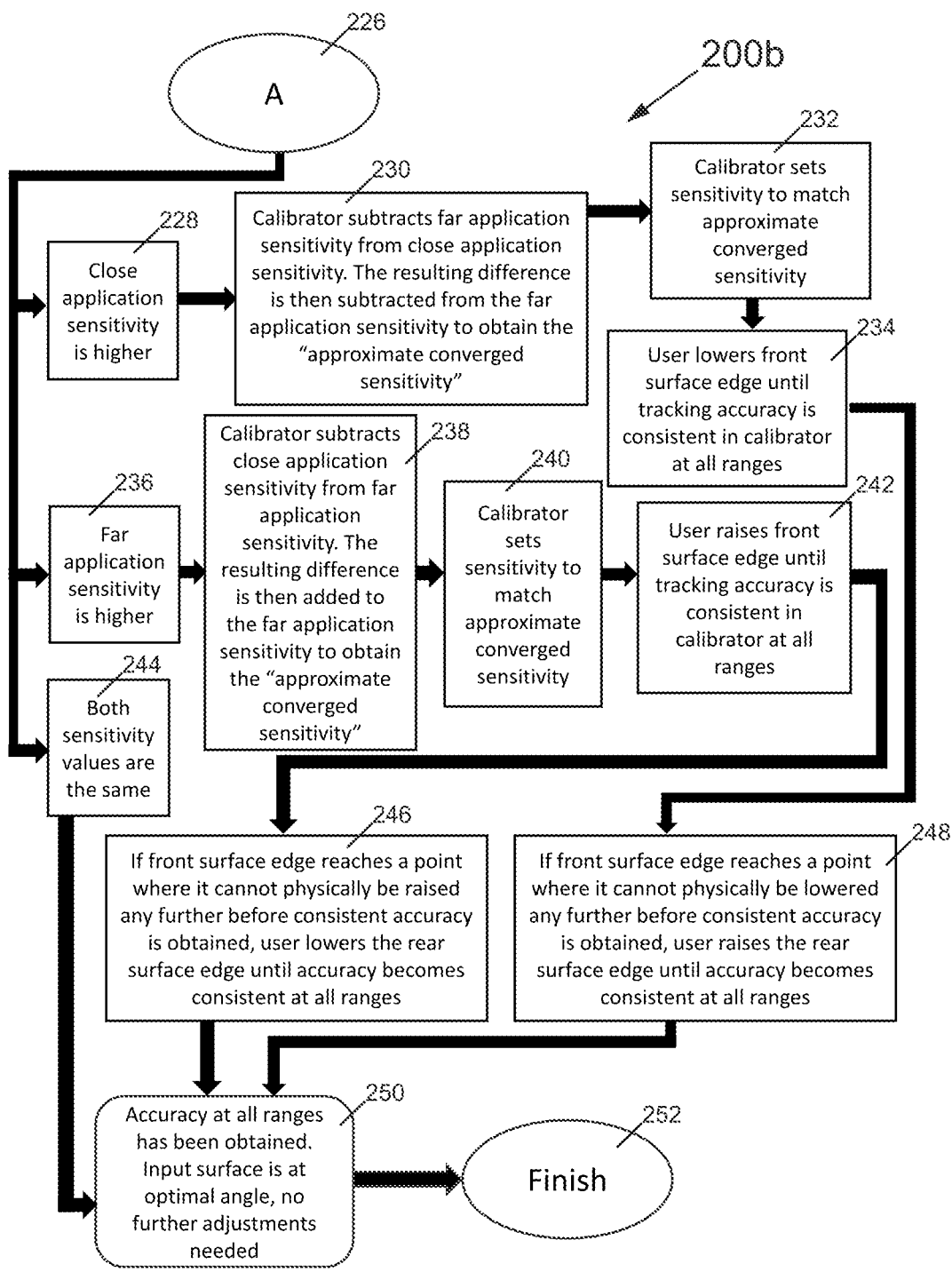
FIG. 3B shows a second part of the second flow chart for the second method for use with the apparatus of FIG. 1 in accordance with an embodiment of the present invention.

From step 224 to step 226, the method of parts 200*a-b*, next starts with 200*b* part in FIG. 3B.

At step 228, it is determined, in one scenario, by computer processor of computer 2, that close application sensitivity is higher than far application sensitivity and in this case, steps 230, 232, 234, and 248 are executed by computer processor of the computer 2. At step 230, the calibrator subtracts far application sensitivity from close application sensitivity, storing the difference in computer memory. This difference is then subtracted from the far application sensitivity to obtain the "approximate converged application sensitivity". At step 232, the calibrator sets application sensitivity to match approximate converged application sensitivity. At step 234, the user lowers front surface edge until tracking accuracy is consistent in 3D application at all ranges. At step 248, if the front surface edge 12*a* reaches a point where it cannot be physically lowered any further before consistent accuracy is obtained, begin raising the rear surface edge 12*b* until accuracy becomes consistent at all ranges in the calibrator.

At step 236, it is determined, in an alternative scenario, by computer processor of computer 2, that far application sensitivity is higher than close application sensitivity and, in this case, steps 238, 240, 242, and 246 are executed by the computer processor of the computer 2. At step 238 the calibrator subtracts "close application sensitivity" from "Far application sensitivity", storing the difference in computer memory. This difference is then added to the far application sensitivity to obtain the "approximate converged application sensitivity". At step 240, the calibrator sets application sensitivity to match approximate converged application sensitivity. At step 242, the user raises front surface edge 12*a* until tracking accuracy is consistent in 3D application at all ranges. At step 246, if the front surface edge 12*a* reaches a point where it cannot physically be raised any further before consistent accuracy is obtained, begin lowering the rear surface edge 12*b* until accuracy becomes consistent at all ranges in the calibrator.

At step 244, it is determined, in an alternative scenario, that both eDPI values ("close application sensitivity" and "Far application sensitivity") are the same by the computer processor of the computer 2.

In any of the three scenarios starting at steps 228, 236, and 244, ultimately, step 250 will be executed. At step 250, the maximum input precision at all ranges has been obtained, which can be confirmed by the user testing accuracy against targets at various ranges in the calibrator. In addition at step 250, the input surface 16 is at an optimal angle, no further adjustments are needed.

At step 252 the method shown by parts 200*a* and 200*b*, is finished.

Figure 4:
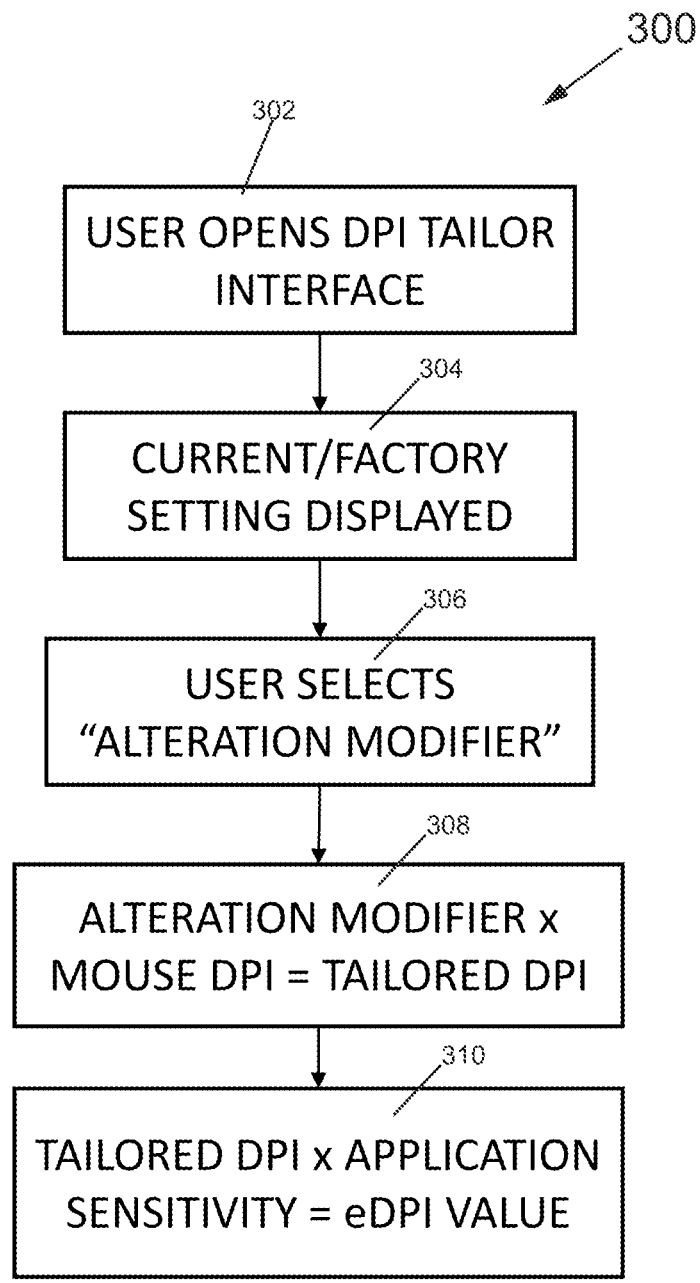
FIG. 4 shows a third flow chart for a third method for use with the apparatus of FIG. 1 in accordance with an embodiment of the present invention.

FIG. 4 shows a third flow chart 300 for a third method for use with the apparatus 1 of FIG. 1 in accordance with an embodiment of the present invention.

At step 302, a user opens DPI tailor interface on the computer monitor 4, typically by using a computer interactive device, such as one or more of computer keyboard 6 and/or computer mouse 8 shown in FIG. 1, as programmed by computer software stored in computer memory of the computer 2, and as implemented by a computer processor of the computer 2.

At step 304, the current/factory setting is displayed on the computer monitor or display 4, as programmed by computer software stored in computer memory of the of the computer 2, and as implemented by a computer processor of the computer 2.

At step 306, the user selects an "alteration modifier" by using an interactive device, such as one or more of computer keyboard 6 and/or computer mouse 8, to select a field in the DPI tailor interface on computer monitor 4 and enter a numeric decimal value.

At step 308, the "alteration modifier" times the "mouse DPI" is calculated by the computer processor of the computer 2 to determine the "tailored DPI" which is stored in computer memory of the computer 2, as programmed by computer software stored in the computer memory of the computer 2 and as implemented by a computer processor of the computer 2.

At step 310, the "tailored DPI" multiplied by the "Application Sensitivity" would logically result in the "eDPI value". To assist in producing specific eDPI values, the DPI tailor interface would allow the user to input the application sensitivity of the intended application and would show a calculation for eDPI so that the user can see what the resultant logical eDPI value would be for any tailored DPI multiplied by whatever application sensitivity value is entered.

For the sake of brevity and easy understanding, any reference below to "adjusting input surface angle" actually indicates that the angle A1 in FIG. 10 or A2 in FIG. 11, of the support structure or member 16 underneath the input surface or here mousepad 12 in FIG. 1, is being adjusted. Because the bottom surface of the input surface 12 sits on the surface 16a of the support structure 16, the top surface of the input surface 12 changes angle when the support structure 16 does.

Please note that the following descriptions will detail situations where a user would be using a mouse 8, that does not have adjustable "forward to backward tilt" or "left to right tilt" options (just like in computer mice today, where these tilt options are not present) and how adjusting the angle of the input surface 12 (which in turn adjusts the angle of the mouse 8) affects aim precision in the 3D space. Keep in mind that if the mouse 8 had adjustable "forward to backward tilt" or "left to right tilt" options, the input surface 16a of the member 16 could be left in a static position, the corresponding mouse 8 tilt adjustments could be made, and all of the results listed below would still take place.

It is imperative that the input surface 12 is consistently flat across the area that the mouse 8 is going to be moved across. Any bumps or dips in the input surface 12 will create inconsistency in aim precision. Also, the support structure 16 underneath the input surface 12 must be very rigid and sturdy so that neither the surface support 16 nor the input surface 12 can bow, flex, warp, or fold, which could be particularly likely to happen when the angle A1 in FIG. 10 or A2 in FIG. 11, is changed on a support structure that is not rigid and sturdy. These considerations make material composition choices of the support structure 16 and input surface 12 very important.

Please note that there is not one single "perfect angle" of a mouse 8 that would be optimal for a user to use in all situations. In a given set of circumstances, when a change is made to mouse angle (such as swapping to a new mouse 8, or raising or lowering desk 10 height) or mouse/surface friction (by introducing or swapping out mousepads for input surface 12), the angle of the input surface 12 must be adjusted to compensate to correct aim precision. Once optimized, if any significant change is later made to the mouse angle (such as swapping to a new mouse 8, or raising or lowering desk 10 height) or mouse/surface friction (by introducing or swapping out mousepads for input surface 12), the input surface angle A1 in FIG. 10 need to be optimized again.

(e) Fifth factor—Limitations of current mouse sensors, DPI settings, and in-application sensitivities. (Apparently unknown to industry)

This fifth factor relates directly to the second factor and also has a limiting effect of the accuracy that can be realized using the input surface calibration detailed in the description of one or more embodiments of the present invention for the fourth factor.

At the time of this filing, most modern mouse sensors are limited to DPI changes in increments of 50.0 or 100.0, and general consensus indicates that only DPI values between 400.0 and 1600.0 produce consistent tracking results. This limits DPI selection to 400.0, 450.0, 500.0, 550.0, 600.0, 650.0, 700.0, 750.0, 800.0, 850.0, 900.0, 950.0, 1000.0, 1050.0, 1100.0, 1150.0, 1200.0, 1250.0, 1300.0, 1350.0, 1400.0, 1450.0, 1500.0, 1550.0, or 1600.0.

Also most computer software is written so that the sensitivity multiplier can only handle two spaces after the decimal (e.g. a sensitivity of 2.36), though some can handle up to five or six spaces after the decimal (e.g. a sensitivity of 2.36653 or 2.366538).

Because both DPI and sensitivity choices are limited, only certain eDPI values are available for a user to use, even if using calculations to maximize the range of available eDPI options, including some that would be considered obscure to the average user.

For example . . .
a DPI of 800.0 and a sensitivity of 4.35 produces an eDPI value of 3480.0
a DPI of 550.0 and a sensitivity of 6.33 produces an eDPI value of 3481.5
a DPI of 900.0 and a sensitivity of 3.87 produces an eDPI value of 3483.0

Please note that there is no option to use an eDPI of 3481.0 or 3482.0, and there is also no current way to calculate a usable eDPI that is between 3480.0 and 3481.5. Once the input surface, such as input surface 12 of FIG. 1, has been adjusted to a degree that tracking tests indicate that the angle has been set properly, the user may find that 3480.0 is too low of an eDPI to be most accurate, and that 3481.5 is too high of an eDPI to be most accurate. In this instance, users currently have no way to adjust their eDPI to a value that is between 3480.0 and 3481.5. If it were possible to use eDPI settings that are not currently available, the user may find that the eDPI that would be needed for extremely precise aim could be approximately 3480.5, or they might determine that they need an even finer eDPI adjustment like 3480.55, or an even finer eDPI setting such as 3480.558 or 3480.5581354. Again, none of these eDPI settings are currently possible to use.

Because the importance of input surface angle was not previously known to the industry, it seems like mouse manufacturers currently don't believe that mouse sensors that can be adjusted in increments less than 50.0 would have any profound effect on input accuracy, and also a sensor with a 50.0 dpi increment limit is likely more cost effective to produce than one that could be adjusted in one degree increments (or even less). Considering the factor of input surface angle that one or more embodiments of the present invention resolves, and for the sake of accuracy that could be further optimized beyond what is possible today, new mouse sensors should be designed that are able to be adjusted in DPI increments of 0.00001 (or even less).

If this is not considered technically or financially feasible, computer software developers need to adopt a policy where sensitivity in applications will be always expressed and actioned well beyond the standard two decimal spaces. Currently, a sensitivity that functions to at least twenty decimal places would be desired.

(Please note that though the current application describes the calibration process as such that application sensitivity values are constantly being adjusted, if eDPI options with significantly more decimal places become available in the future, eDPI would be used instead of application sensitivity when completing calibration. This would allow for mouse accuracy to be fine-tuned to an even farther level than what is possible today.)

(f) Sixth Factor—The height of the input surface 12 in relation to the user. (This factor does not appear to be known by the industry as having an effect on mouse 8 precision.)

This factor is classified as indirect, because if the current limitations of input sensor DPI increments and software sensitivity decimal value restrictions were removed, it may be possible that all of the first five factors could be adjusted to achieve aim precision on their own. In that scenario, any reasonable input surface height could be used.

The height of the Input surface 12 can be altered in a couple of ways. For example, an adjustable desk surface 10 could be raised, thus the input surface 12 that rests on it would move higher. Alternatively, if the support structure 14 underneath the input surface 12 had mechanisms to change height, these adjustments would also effectively alter the height of the input surface 12.

As the input surface 12 is raised, from the user perspective, it will appear to gain friction. As it relates to aim precision, this gradual friction gain is more pronounced for tracking close range targets on the computer monitor 4 and is less pronounced for far range targets on the computer monitor 4. As the input surface 12 is raised, the eDPI values will need to be increased to compensate, and the close eDPI will need to increase in larger increments than the far eDPI as the input surface 12 continues to be raised. Generally speaking, for every 1.0 eDPI that the far range is increased, the close eDPI would need to be increased by approximately a value of 2.0, as the input surface 12 is raised. This two to one ratio is not exact, and appears to be affected by different friction levels for input surfaces as well as extremely low or high surface heights.

The following explains how the six elements of pointing input device precision interact with each other:

Without the use of one or more embodiments of the present invention, the friction encountered while moving the computer mouse 8 in FIG. 1, across the input surface 12 will not be consistent. Even if the input surface 12, the input surface support 16, and the feet of the mouse 8 are all extremely flat and smooth, the user will still encounter constantly changing levels of friction when moving the mouse 8 across the input surface 12.

In at least one embodiment, examining the results of tracking accuracy is the most straightforward way to determine how much friction is being encountered when a user tracks a target. The eDPI values associated with a user's best tracking results for targets at different ranges give a clear indication of how much friction is being encountered when the user is moving the mouse 8 across the input surface 12. The amount of friction encountered when accurately tracking a target at a specific range directly correlates to the eDPI that is required to overcome this friction. If accurately tracking a close range target requires a lower eDPI than accurately tracking a far range target, this indicates that less friction has been encountered when tracking the close range target compared to the far range target. If accurately tracking a close range target requires a higher eDPI than accurately tracking a far range target, this indicates that more friction has been encountered when tracking the close range target compared to the far range target.

As described previously, without the use of one or more embodiments of the present invention, it is possible to adjust mouse settings in such a way that the user will be able to maintain accurate tracking at a certain range, but will almost always find difficulty in producing a similar level of accuracy when tracking targets at any ranges that are significantly closer or farther away. This is because of the differing levels of friction encountered, and the different levels of eDPI that would be needed to overcome each level of friction. In software applications currently, there is only one eDPI value that exists in a program at any specific moment in time, and that value is equal to the multiplicative product of the mouse DPI value and the application sensitivity.

Without the use of one or more embodiments of the present invention, a user must set the mouse DPI and application sensitivity so that the resultant eDPI value is optimized for accuracy at a certain range, and then the user will have to intentionally and consciously increase or decrease the amount of mouse travel distance on the input surface when tracking targets at any other ranges in an attempt to maintain consistent accuracy. Because of the level of concentration and discipline required from the user to maintain the wide range of ever-changing mouse movement patterns, having highly accurate results using this method over a long duration are generally not sustainable. In an attempt to get around friction inconsistencies, some users will wear gloves or sleeves made of low friction material to situationally assist with friction inconsistencies when making long distance movements of the mouse 8, but these products produce mixed results at best. Before the creation of one or more embodiment of the current invention, there was no way to effectively overcome the inherent friction inconsistencies encountered.

To move a mouse 8 across an input surface 12, the user applies force to the mouse 8. The inconsistency of friction that the user will encounter when moving the mouse 8 is caused by differences in how this force is distributed between the mouse 8 and the input surface 12 as the mouse 8 moves closer to or farther away from the user on the input surface 12, and these differences are affected by a number of relevant physical angles. The angle of the input surface support 16, the angle of the input surface 12, the angle of the mouse 8, the angle of the hand of the user as the user's hand grips the mouse 8, and the angle of the wrist of the user, with respect to the horizontal desk surface 10, with respect to some other horizontal surface, with respect to a ground surface, or with respect to some part of a user's body, all affect the level of friction felt when the mouse 8 is moved. (Regarding all of the angles that factor into friction, determining which angles produce more or less friction in any given situation is beyond the scope of this documentation.)

In a given set of conditions, many of these angles cannot reasonably be changed to any significant degree. A desk chair with a wide range of adjustable height settings is still functionally limited to a height range totaling only a few inches that would be comfortable for any specific user. Setting the chair higher or lower than this range will produce discomfort or pain for the user almost immediately. Most desks do not have height adjustment capabilities, but even those that do currently lack the ability to make minute adjustments to the height, and the difference between the highest and lowest height settings are generally less than 12.0 total inches. Even within this 12.0 inch range, the user will probably find that the top half of this range is unusable from a seated position because it makes the user's wrist or arm uncomfortable.

With a particular computer mouse at a particular desk height, a user will find that there is functionally only a very small range of angles (likely all within one degree) for the positioning of the hand and wrist that is comfortable and also produces the result of a high level of accuracy for that particular user. Without the use of the present invention, at a particular desk height, there is generally no reasonable way to adjust the angle of the input surface support or the input surface.

The main goal of this invention is to adjust one or more of the angles that can reasonably be changed by the user, overcoming the limitations that occur from the combination of all of the other relevant angles that cannot reasonably be changed, for the sake of producing the highest tracking accuracy results possible. This goal is considered to be met when the eDPI required to track targets at a vast array of ranges (or optimally, all ranges) is found to be the same throughout those ranges. This indicates that the relevant modifiable angles have been adjusted in such a way that the friction encountered while moving a mouse across an input surface is consistent across that input surface.

Please note that once this consistency has been obtained, if any of the previously mentioned angles are changed, such as from changing to a new mouse (which would change the hand and/or wrist angle), or from the user intentionally attempting to use a different wrist angle, or from the user previously sitting but now standing (which would change the hand and/or wrist angle), or from the desk height changing (which would change the hand and/or wrist angle), this newfound consistency will cease to exist, and the calibration process will need to be completed again to create friction consistency under the new conditions.

Please note that changing the height position of any of the previously mentioned elements (such as the pointing input device 8, input surface 12, input surface support 16, desk surface 10, user's arm, or user's hand) in relation to any of the other elements also effectively changes the angle between these elements.

Possible Limitation Workarounds

As previously detailed, the current state of mouse sensor DPI increments and software sensitivity decimal point values only allows certain eDPI values to be calculated. If software were developed that could operate as an additional multiplier in the eDPI calculation, it would allow for significantly more eDPI values than what is currently possible. No software like this appears to exist today. The present invention in one or more embodiments discloses methods including computer software which will be referred to as "DPI tailor".

In at least one embodiment of the present invention, the DPI tailor takes the form of an application that runs in the background, or firmware that exists in the mouse 8. When the user opens the DPI tailor interface, using the computer 2 on the monitor 4, the current mouse DPI setting is displayed. The user types in or chooses an "alteration modifier", which is then multiplied to the mouse DPI to produce a "tailored DPI". This tailored DPI would then be multiplied to application sensitivity to produce the eDPI value.

As detailed in a previous section, though today eDPI values of 3480.0 and 3481.5 can be logically calculated, no eDPI value between these numbers can be, including 3481.0. If the DPI tailor were designed to allow alteration modifiers that were valid to at least twenty decimal places, a significant number of new possible eDPI values between 3480.0 and 3481.5 could be achieved and easily calculated by a user.

Using an input DPI of 1000.0 with an alteration modifier of 3.48075 creates a tailored DPI of 3480.75. If an application sensitivity of 1.0 is used, it results in an eDPI of 3480.75

Using an input DPI of 1000.0 with an alteration modifier of 3.4808125 creates a tailored DPI of 3480.8125. If an application sensitivity of 1.0 is used, it results in an eDPI of 3480.8125 Using an input DPI of 1000.0 with an alteration modifier of 3.480875 creates a tailored DPI of 3480.875. If an application sensitivity of 1.0 is used, it results in an eDPI of 3480.875

Using an input DPI of 1000.0 with an alteration modifier of 3.4809375 creates a tailored DPI of 3480.9375. If an application sensitivity of 1.0 is used, it results in an eDPI of 3480.9375

Using an input DPI of 1000.0 with an alteration modifier of 3.481 creates a tailored DPI of 3481.0. If an application sensitivity of 1.0 is used, it results in an eDPI of 3481.0

Please note that though setting the alteration modifier in the DPI tailor software has been described as a manual process that the user completes, this could also be done automatically by the calibrator software. Having alteration modifiers set and adjusted automatically during the calibration process would be much preferred to the user having to make multiple small adjustments to the values.

Instead of DPI tailor software, adjustments to input surface 12 height can situationally be used as a workaround to achieve a higher degree of aim precision than what would otherwise be possible.

For a given set of circumstances, once an optimal surface angle is achieved, if it is determined that the eDPI value that needs to be used is one that is impossible to be calculated (because of current mouse sensor DPI increments and software sensitivity decimal point restrictions), the user could attempt a workaround by setting the closest valid eDPI value, and then altering input surface height. This process would involve continuing to adjust the surface height and surface angle until a height/angle combination is found that results in the most precise aim.

Most users will probably find that this process is too manual, and takes too long to complete, so the calibrator software should be used to assist in determining combinations that produce the most optimal tracking accuracy.

In at least one embodiment of the present invention, the member 16 of the device 14 may be a thin rigid board made of metal, tempered glass, or some similar material (which would be placed on table/desk surface 10) that has small boxes 18, 20, 22, and 24 on each of its four corners, as shown in FIG. 1. The boxes 18, 20, 22, and 24 may contain plastic shim wedges and motors that would move them according to how the computer software directed them. In at least one embodiment, the boxes 18, 20, 22, and 24 are connected to each other with a wire under the board 16, and are connected to the computer 2 and powered with a USB cable. There is an input surface 12, which is made from a premium material such as textured leather or rubber, attached to the board 16.

Figure 7:
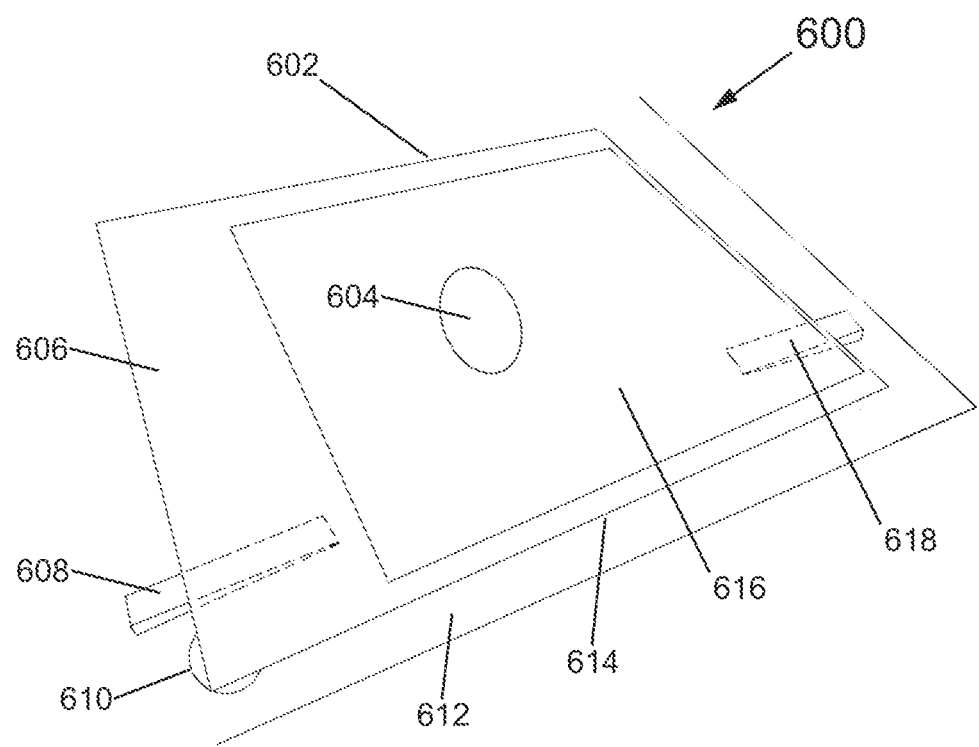
FIG. 7 is a simplified diagram of a layout of an apparatus in accordance with an additional embodiment of the present invention.

In at least one embodiment, as shown in FIG. 7, wedges 608 and 618 may be provided that go underneath input surface support 606 to adjust angle of input surface 616.

In another embodiment, wedges (not shown) may go under the table/desk support structure 10 to adjust angle of table/desk surface 10.

Figure 8:
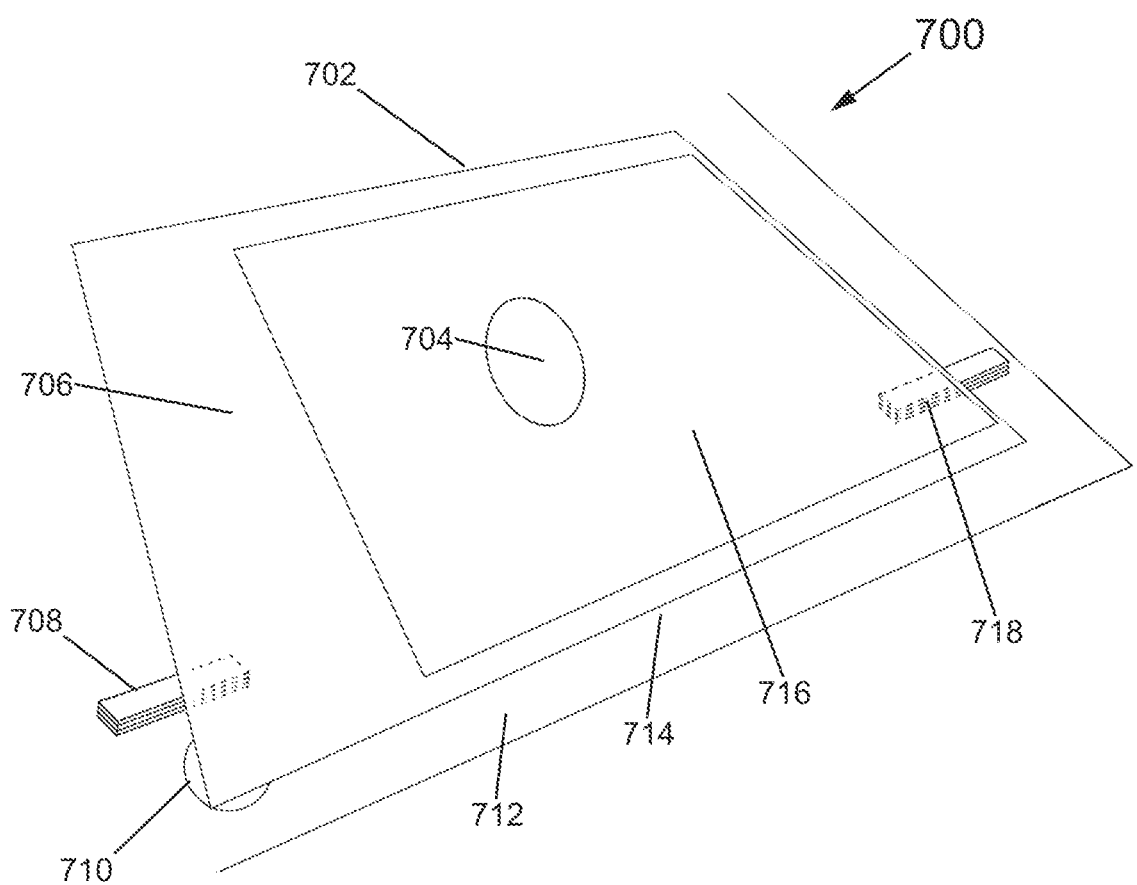
FIG. 8 is a simplified diagram of a layout of an apparatus in accordance with a further embodiment of the present invention.

In at least one embodiment of the present invention, as shown in FIG. 8, thin stackable shims 708 and 718 go underneath input surface support 706 to adjust angle of input surface 716. These may be made of paper, plastic, thin rigid metal, or similar materials.

Figure 9:
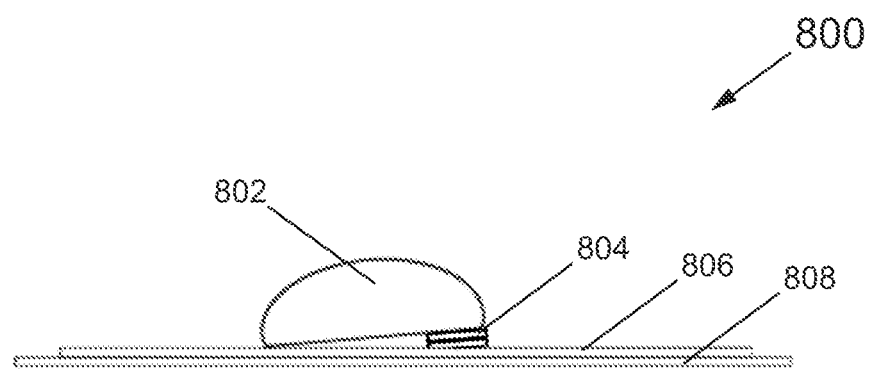
FIG. 9 is a simplified diagram of a computer mouse, with means for adjusting an angle of the computer mouse with respect to a surface.

In at least one embodiment of the present invention, as shown in FIG. 9, thin stackable shims 804 go underneath and attach to the mouse 802 to adjust the front to back height angle of the mouse. These would be made of plastic.

Figure 13:
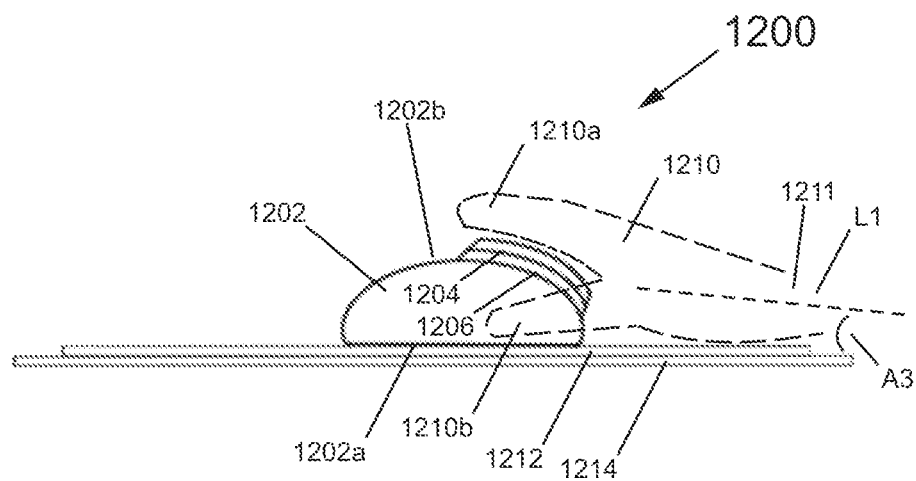
FIG. 13 shows a simplified diagram of a computer mouse with a means for adjusting the angle of a user's wrist, hand, or one or more fingers with respect to a ground surface, a horizontal surface, and/or with respect to an arm of the user.

FIG. 13 shows a diagram 1200 of a computer mouse 1202 (which may be identical to mouse 8 of FIG. 1) having a top surface 1202b and a bottom surface 1202a. The bottom surface 1202a of the mouse 1202 sits on a horizontal surface 1212, which sits on a horizontal surface 1214. The horizontal surfaces 1212 and 1214 may sit on a horizontal ground surface, not shown. FIG. 13 also shows a hand 1210, with an index finger 1210a and a thumb 1210b shown. The hand 1210 is connected to a wrist 1211.

In at least one embodiment of the present invention, as shown in diagram 1200 in FIG. 13, thin stackable shims 1204 and 1206 have been attached to the top surface 1202b of a mouse 1202, such as by adhesive to help adjust a hand or wrist angle A3 that the user would use when gripping the mouse 1202. The shims 1204 and 1206 may be made of plastic. In the example of FIG. 13, the wrist angle A3, is presumed to be the angle between a line L1 and a horizontal surface, such as one of surfaces 1212 and 1214, or a horizontal ground surface. In this example, L1 is a line which may divide the mass of a hand 1210 in half, with half of the mass of the hand 1210 being above line L1 and half of the mass of hand 1210 being below the line L1.

In at least one embodiment, a mouse 8 with adjustable height/tilt functions (not shown) is provided. The top shell and bottom shell are connected with an adjustable segment, allowing adjustable height and tilt positions for the top of the mouse.

In at least one embodiment, sturdy poles (not shown) go underneath desk/table surface 10, with manual or automatic adjustments to extend or contract the poles to allow the front or back of the desk/table 10 to be raised in small increments.

In at least one embodiment, a small table (not shown) with angle/height adjustments for height/angle of the table surface.

In at least one embodiment, a desk (not shown) with angle/height adjustments for height/angle of the desk surface.

Figure 5:
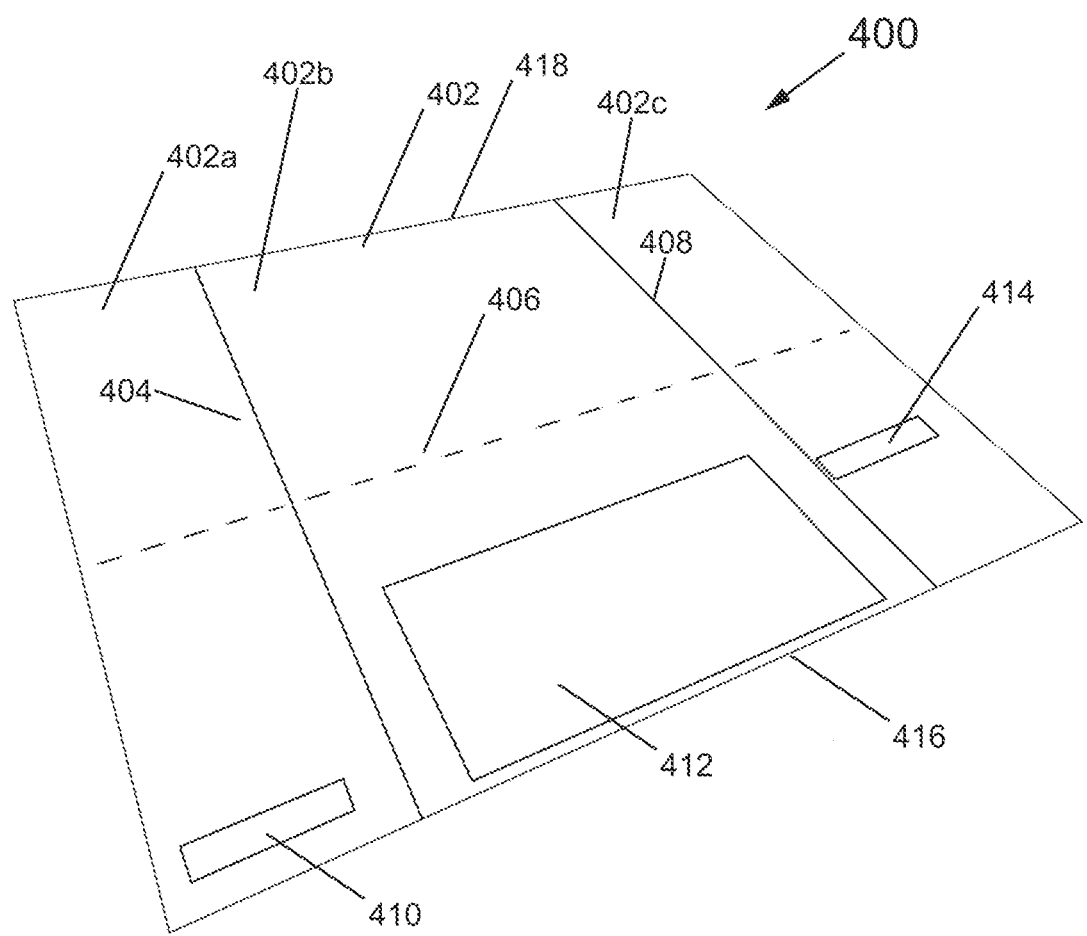
FIG. 5 is a simplified diagram of a layout of an apparatus in accordance with another embodiment of the present invention.

FIG. 5 is a simplified diagram of a layout 400 of an apparatus in accordance with another embodiment of the present invention.

In at least one embodiment, a tempered glass plate, not shown, would sit over what is pictured, i.e., in one example, overlapping the exact outline the entire rectangular shape 402 of the layout 400 of FIG. 5.

The input surface (i.e. the mousepad, not shown) would sit on the center of the glass plate. The layout shows a dotted line 406, which indicates the center of the input surface support, underneath the rectangular shape 402. There are small platforms 410, 412, and 414 on each of three grids 402a, 402b, and 402c, respectively, and height shims, (not shown, made of paper, plastic, thin rigid metal, or similar materials) would sit on the platforms 410, 412, and/or 414 or be built directly into the platforms 410, 412, and 414. For the purposes of this explanation, any further reference to a platform indicates that a shim is built into it, or a shim is present on the platform. One or more motors, not shown, would move these platforms 410, 412, and 414 along the X and Y axis, with respect to rectangular shape 402. The optimal positions for the platforms 410, 412, and 414 would be determined by the results of the calibrator.

Figure 6:
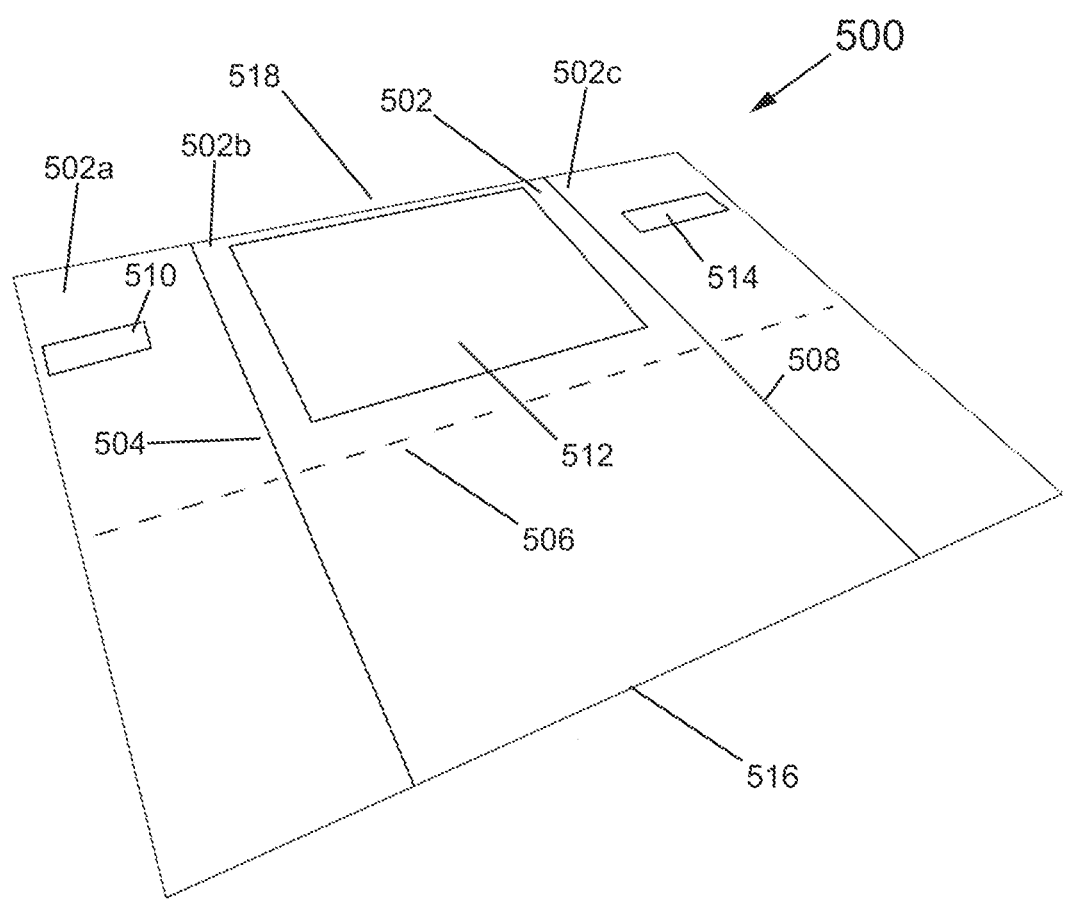
FIG. 6 is a simplified diagram of a layout of an apparatus in accordance with yet another embodiment of the present invention.

FIG. 6 is a simplified diagram of a layout 500 of an apparatus in accordance with another embodiment of the present invention. In at least one embodiment, a tempered glass plate, not shown, would sit over what is pictured, i.e., in one example, overlapping the exact outline the entire rectangular shape 502 of the layout 500 of FIG. 6.

The input surface (i.e. the mousepad, not shown) would sit on the center of the glass plate. The layout shows a dotted line 506, which indicates the center of the input surface support, underneath the rectangular shape 502. There are small platforms 510, 512, and 514 on each of three grids 502a, 502b, and 502c, respectively, and height shims, (not shown, made of paper, plastic, thin rigid metal, or similar materials) would sit on the platforms 510, 512, and/or 514 or be built directly into the platforms 510, 512, and 514. For the purposes of this explanation, any further reference to a platform indicates that a shim is built into it, or a shim is present on the platform. One or more motors, not shown, would move these platforms 510, 512, and 514 along the X and Y axis, with respect to rectangular shape 502. The optimal positions for the platforms 510, 512, and 514 would be determined by the results of the calibrator.

The position of platforms 410, 412, and 414 for FIG. 5, or platforms 510, 512, and 514 for FIG. 6 has a significant effect on the tilt of the input surface support, and the presence of the innermost platform also acts as a stabilizer to reduce any flex that input surface support has. In FIG. 5, the innermost platform is platform 412. In FIG. 6, the innermost platform is platform is platform 512. (On its own, tempered glass often has a significant amount of flex when pressure is applied to it.)

Once a calibrator stored in computer memory of computer 2 and executed by a computer processor of computer 2, begins its process, the platform (such as platform 412 or 512) is moved first to make rough changes to the angle of the input surface. Please note that platforms 410, 412, and 414 in FIG. 5 are identical to the platforms 510, 512, and 514 in FIG. 6, other than the position location of each platform. Platforms 410, 412, and 414 are closest to the front surface edge 416, while platforms 510, 512, and 514 are closest to the rear surface edge 518. The movement adjustments of the platform (such as platform 412 and 512) is configured to be small, and is typically measured in increments less than a millimeter.

While platform 412 or 512, for example, is being moved, the calibrator of computer 2, determines whether each platform movement has resulted in the tracking accuracy percentage increasing or decreasing. The platform repositioning will continue, as executed by the computer 2, until the tracking precision reaches the highest percentage of accuracy recorded during the calibration process. At this point, the calibrator returns the platform 412 or 512 to the position that produced the highest tracking accuracy percentage and then stops the movement of platform 412 or 512.

The positions of the outermost platforms (platforms 410 and 414 in FIG. 5 and platforms 510 and 514 in FIG. 6) control the fine tuning of the angle of the input surface 402.

Once platform 412 or 512 has been moved to what has been determined to be the optimal position, platforms 410 and 414 or 510 and 514 will alternate being moved into various positions on the X and Y axis. The platforms 410 and 414 or 510 and 514 movement adjustments will be small, and typically is measurable in increments less than a millimeter.

After platforms 410 and 414 or 510 and 514 are moved, the calibrator of the computer 2, is programmed to determine whether each platform movement of platforms 410 and 414 or 510 and 514 has made the tracking precision better or worse after the user fires on the target indicated. While platforms 410 and 414 or 510 and 514 are being moved in a particular direction, as long as the tracking results stay similar or improve, the particular platform of platforms 410 and 414 or 510 and 514, will continue to move in the same direction. At some point during this movement, the tracking result will worsen. Once this occurs, that platform of platforms 410 and 414 and 510 and 514 will be moved back into the position that resulted in the highest tracking accuracy.

The platform repositioning will continue, as programmed by computer software in the computer 2, until the tracking precision reaches the highest percentage of accuracy recorded during the calibration process. At this point, the calibrator will stop the platform movement, and display to the user on computer monitor 4 that the calibration process has been completed.

When the three platforms 410, 412 and 414 of FIG. 5 or 510, 512, and 514 of FIG. 6 are positioned closest to the input surface support front edge 416 and 516 (as shown in FIG. 5) and the platforms 410, 412, and 414 or 510, 512, and 514, are moving towards the center of the input surface support 402 or 502, this is known as "raising the front surface edge"

When the three platforms 410, 412, and 414 of FIG. 5 or 510, 512, and 514 of FIG. 6 are positioned closest to the input surface support front edge 416 and 516 (as shown in FIG. 5) and the platforms 410, 412, and 414 or 510, 512, and 514 are moving away from the center of the input surface support, this is known as "lowering the front surface edge".

When the three platforms 410, 412, and 414 or 510, 512, and 514 are positioned closest to the input surface support rear edge 418 and 518 (as shown in FIG. 6), and the platforms are moving towards the center of the input surface support, this is known as "raising the rear surface edge".

When the three platforms 410, 412, and 414, or 510, 512, and 514 are positioned closest to the input surface support rear edge 418 and 518 (as shown in FIG. 6), and the platforms 410, 412, and 414 or 510, 512, and 514 are moving away from the center of the input surface support 402 or 502, this is known as "lowering the rear surface edge".

FIG. 7 is a simplified diagram of a layout of an apparatus 600 in accordance with an additional embodiment of the present invention. The apparatus 600 includes wedges 608 and 618 that are configured to be moved underneath the input surface support 606. The mouse 604 rests on the input surface 616, which rests on the input surface support 606. The apparatus 600 may include one or more rubber bumpers 610 to help prevent the input surface support 606 from sliding around when elevated above the surface of the desk 612. Movement adjustments to the wedges 608 and 618 will raise or lower the input surface support, which will cause changes to input precision of the mouse 604.

FIG. 8 is a simplified diagram of a layout of an apparatus 700 in accordance with an additional embodiment of the present invention. The apparatus 700 includes the stackable shims 708 and 718 that are configured to be moved underneath the input surface support 706. The mouse 704 rests on the input surface 716, which rests on the input surface support 706. The apparatus 700 may include one or more rubber bumpers 710 to help prevent the input surface support 706 from sliding around when elevated above the surface of the desk 712. Movement adjustments to the stackable shims 708 and 718 will raise or lower the input surface support, which will cause changes to input precision of the mouse 704.

FIG. 9 is a simplified diagram of an apparatus 800 including a computer mouse 802, with means for adjusting an angle of the computer mouse 802 with respect to a surface. The apparatus 800 includes shims 804 that attach to the mouse 802 to adjust its height angle. The mouse 802 rests on an input surface 806 which rests on the desk 808.

Figure 10:
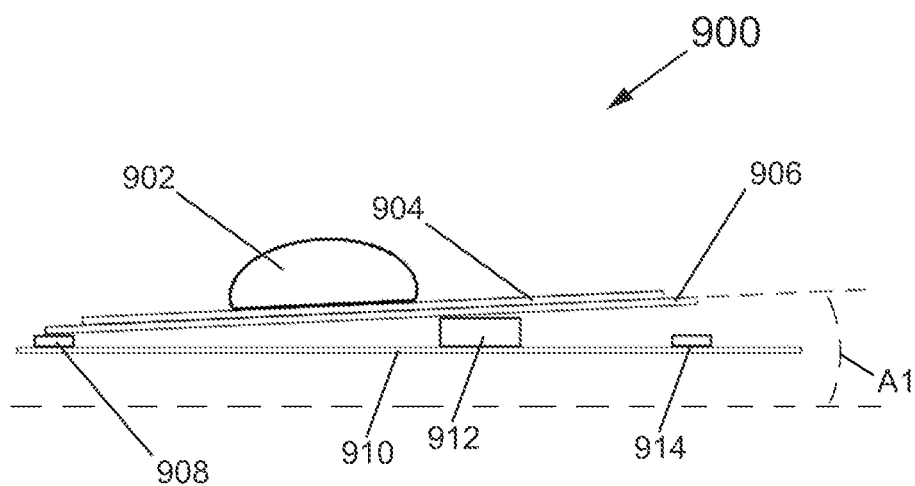
FIG. 10 is a simplified diagram of a computer mouse with another means for indirectly adjusting the angle of the computer mouse with respect to a surface.

FIG. 10 is a simplified diagram of an apparatus 900 including a computer mouse 902, with means for directly adjusting the angle of an input surface support 906 with respect to a surface and indirectly adjusting an angle of the computer mouse 902 with respect to a surface. The apparatus 900 may include a mouse 902, an input surface 904, an input surface support 906, rubber bumpers 908 and 914, a shim 912, and a desk surface 910. The mouse 902 is shown at an angle of A1 with respect to a surface.

FIG. 10 shows the angle of an input surface support 906 (as it relates to a horizontal surface) with the use of the shim 912. Please note that though not explicitly shown as such in the images, this input surface support angle could also be expressed as being in relation to the desk 910, the ground surface, some other horizontal surface, or some part of the user's body.

Figure 11:
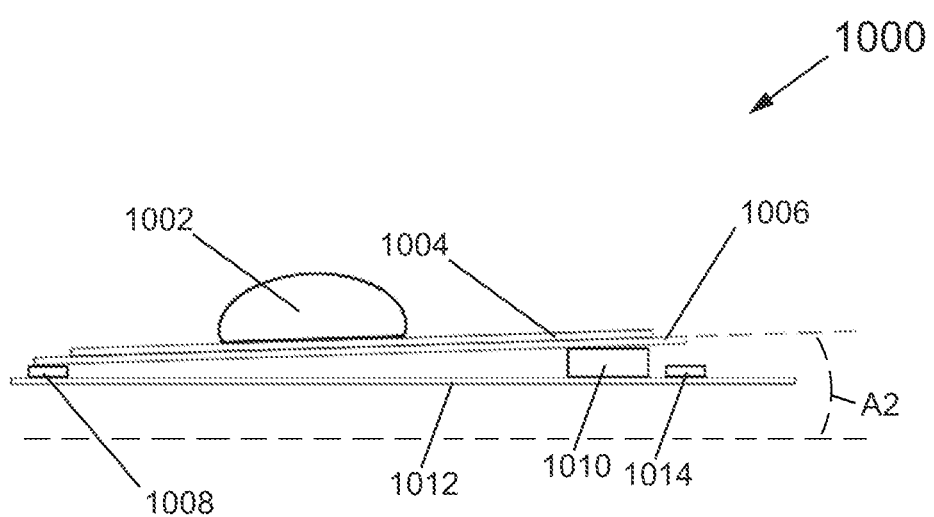
FIG. 11 is a simplified diagram of a computer mouse with an additional means for indirectly adjusting the angle of the computer mouse with respect to a surface.

FIG. 11 is a simplified diagram of an apparatus 1000 including a computer mouse 1002 with an additional means for directly adjusting the angle of an input surface support 1006 with respect to a surface and indirectly adjusting the angle of the computer mouse 1002 with respect to a surface. The apparatus 1000 may include a mouse 1002, an input surface 1004, an input surface support 1006, rubber bumpers 1008 and 1014, a shim 1010, and a desk surface 1012. The mouse 1002 is shown at an angle of A2 with respect to a surface.

FIG. 11 shows the angle of an input surface support 1006 (as it relates to a horizontal surface) with the use of the shim 1010. Please note that though not explicitly shown as such in the images, this input surface support angle could also be expressed as being in relation to the desk 1012, the ground surface, some other horizontal surface, or some part of the user's body. Also note that the angle in FIG. 10 is larger than the angle in FIG. 11.

Figure 12:
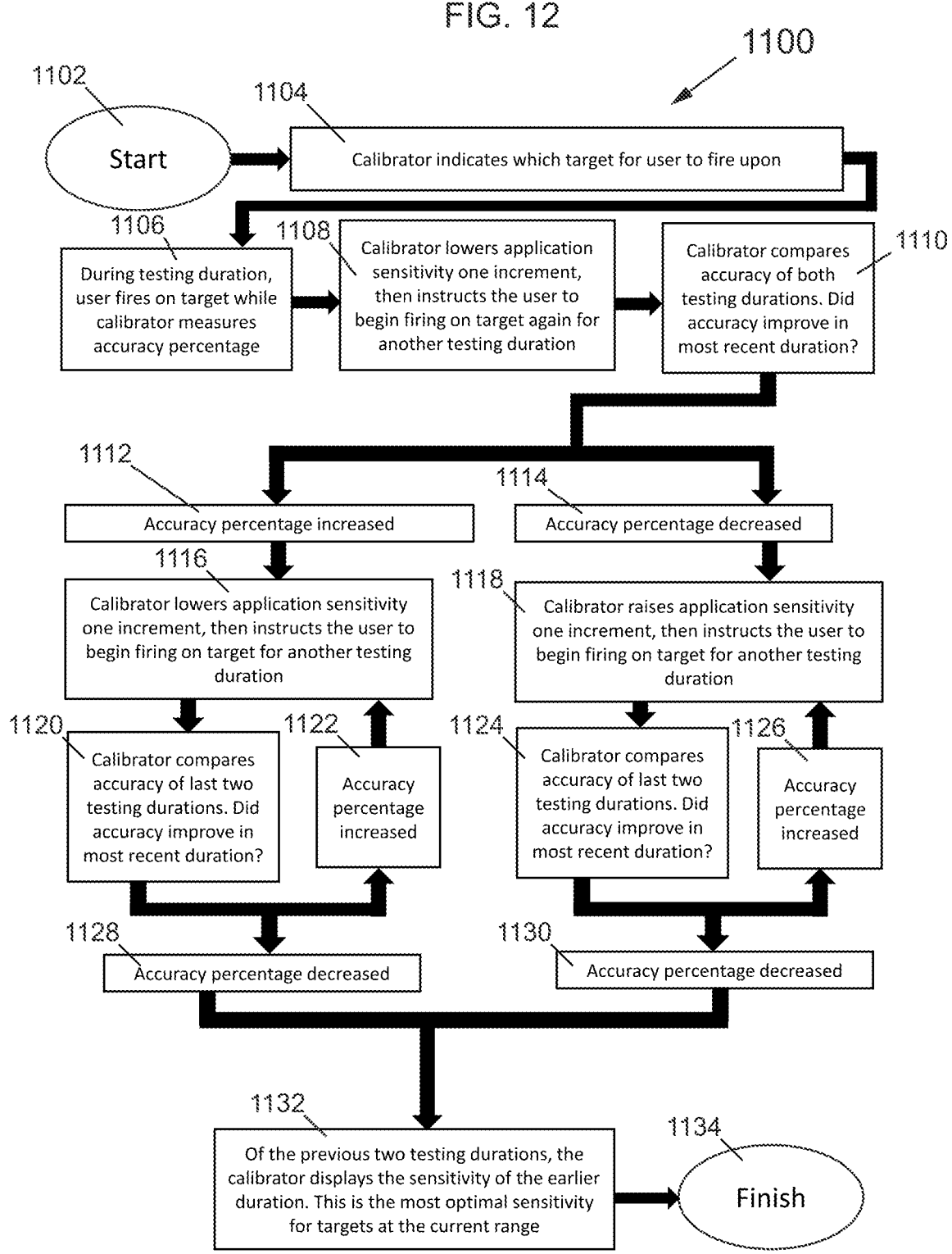
FIG. 12 a flow chart of a calibration process in accordance with an embodiment of the present invention.

FIG. 12 a flow chart 1100 of a calibration process in accordance with an embodiment of the present invention.

The process of FIG. 12 starts at step 1102. Next, the calibrator, at step 1104 which may be implemented through computer software stored in computer memory of computer 2, and executed by a computer processor of computer 2, is programmed by the computer software on computer 2 to indicate which target to fire upon, by providing information, such as through displaying on a computer monitor 4.

Then, at step 1106, during testing duration, a user fires on a target, using a pointing input device, such as a computer mouse 8, and optionally using another input such as a keyboard 6 for avatar movement, while the calibrator computer software on the computer 2 measures accuracy percentage.

The flow continues at step 1108 where the calibrator lowers application sensitivity one increment, and stored this sensitivity in computer memory of computer 2, and then instructs the user, such as through display on the computer monitor 4, to begin firing on a target again for another testing duration.

Next, at step 1110, the calibrator compares the accuracy of both testing durations. The calibrator determines whether the accuracy improved in the latest duration.

If the accuracy increased during the latest duration, then step 1112 is executed, and then step 1116. At step 1116, the calibrator lowers application sensitivity one increment, in computer memory of computer 2, and then instructs the user (such as visually through display on computer monitor 4 or through an audio message through a speaker), to begin firing on target for another testing duration. Following step 1116, the calibrator compares accuracy of last two testing durations at step 1120. If the accuracy percentage increased, then step 1122 is executed and then step 1116 is executed in a loop until the accuracy percentage is decreased as shown at step 1128.

If the accuracy percentage was decreased at step 1110, then steps 1114 and 1118 are executed. At step 1118, the calibrator raises application sensitivity one increment, in computer memory of computer 2, and then instructs the user (such as visually through display on computer monitor 4 or through an audio message through a speaker) to begin firing on target for another testing duration. At step 1124, the calibrator compares accuracy of the last two testing durations. If the accuracy percentage increased, then step 1126 is executed and then step 1118 is executed in a loop until the accuracy percentage is decreased as shown at step 1130.

After the accuracy percentage has been decreased at either steps 1128 or 1130, step 1132 is executed. At step 1132, of the previous two testing durations, the calibrator displays on the computer monitor the sensitivity of the earlier duration. In at least one embodiment, this is the most optimal sensitivity for targets at the current range (stored in computer memory). At step 1134, the calibrator process is finished.

When a computer mouse, such as any of computer mice 8, 604, 704, 802, 902, or 1002 is being used, there are certain physical elements that are generally present. The computer mouse rests on an input surface (e.g. a mousepad), such as any of 12, 616, 716, 806, 904, 1004, which in turn rests on an "input surface support", such as any of 16, 606, 706, 808, 906 or 1006.

Though a desk 10 or table is generally used as the input surface support, the present application will assume that the input surface support is a thin rigid board made of tempered glass that will be present between the desk 10 and the mousepad 12. As compared to a desk 10 or table, the glass board 16 would require less effort to make angle adjustments to and will closely resemble the standard implementation of the present invention.

By adjusting the angle of the input surface support 16 that the input surface 12 either rests on or is attached to, the angle of the input surface 12 changes accordingly. In turn, as the angle of the input surface 12 that the mouse 8 rests and moves on changes, the height angle of the mouse 8 changes accordingly. Adjusting these angles to find those that are most optimal, without the aid of additional software, is very difficult and time consuming. Considering this, calibration software should be relied upon to speed up the process and ensure that all angles are set to achieve the maximum potential accuracy.

The calibration software (hereby known as "the calibrator") in at least one embodiment, contains many settings that will need to be adjusted so that the calibration environment matches whatever application that the user is trying to optimize aim for (hereby known as "the intended application") as closely as possible. These settings include application sensitivity, field of view, and in some applications will also include pitch, yaw, and FOV sensitivity multiplier. Whenever the user needs to determine whether any of these settings are relevant for a specific intended application, it will require the user to look through the application documentation, find information about it on the software developer's website, or research the topic on the internet. In these instances, for the sake of brevity, any further mention of this requirement will be noted only as "will require the user to research."

There would be many benefits for presets for popular applications to be available in the calibrator, so that the user can just select the intended application from the list, and the relevant settings would be set or presented for adjustment. This would remove the research requirements previously mentioned. To make this option possible, the software developer would need to continuously update the software, adding presets for any new popular application that is released.

In at least one embodiment, to begin calibration, the user opens the calibrator computer software on a user computer and adjusts settings for both field-of-view ("FOV") and the application sensitivity multiplier. If, for example, the intended application has a field-of-view of 103.0 and a sensitivity of 4.0, then both of these values should be entered in for the settings of the same name in the calibrator. (The field-of-view setting defines how much of the software environment is being generated on the computer monitor 4 or screen. Setting a smaller value in field-of-view would produce an effect similar to "being zoomed in" constantly, while each increment added to this value would be like slightly "zooming out" the view.) The user should adjust movement speed settings in the calibrator to mimic the intended application so that aiming while moving in the calibrator is similar to the intended application. During the calibration process, if the user does not move an avatar or uses different movement speed settings than the intended application, aim precision in the intended application may not be as optimized as it would be if the movement in the calibrator were set to mirror that of the intended application.

For many applications no other settings will need to be modified, but for some others, additional modifiers would need to be accounted for. The additional settings are pitch, yaw, and FOV sensitivity multiplier. Determining whether an application needs these other settings to be accounted for will require the user to research.

In the applications that use them, pitch and/or yaw act as additional multipliers to application sensitivity. Pitch is a multiplier applied to vertical sensitivity, and yaw is a multiplier applied to horizontal sensitivity. For example, with a DPI of 800.0, an application sensitivity of 7.0 (which creates an eDPI of 5600.0), if the pitch were set as 0.522 and the yaw were set as 0.5625, the total vertical eDPI would be 2923.2 (800×7.0×0.522=2923.2) and the total horizontal eDPI would be 3150.0 (800.0×7.0×0.5625=3150.0).

In the applications that use FOV as a modifier to application sensitivity, pitch and yaw values are generally hidden and cannot be modified directly. Making adjustments to the FOV value adjusts pitch and yaw values. If the POV values are increased, the pitch and yaw values both increase accordingly. If the POV values decrease, the pitch and yaw values both decrease accordingly. For each application, determining which FOV values correspond with which pitch and yaw values will require the user to research. For applications that use an FOV sensitivity modifier, once the values relevant to the intended application have been gathered, the user would enable an option present in the calibrator to apply the POV multiplier to the application sensitivity. The user would then input the relevant POV value.

Once all previously described settings have been adjusted, the user presses the "Start Calibration" button, which begins the process at step 1102, as shown in FIG. 12. In the calibrator, a 3D environment will appear on the computer monitor, such as computer monitor 4 in FIG. 1, that will (at a minimum) contain two targets, a background or floor to help convey a sense of three-dimensional depth, and nothing else. In this case, one target would appear to be at close range of an avatar, and the other target would be at far range from the avatar. Both targets would move around independently of each other and would occasionally change directions. The user would be instructed to press and hold a specific button on the mouse 8 (hereby known as "hold down the fire button") and begin tracking the close range target. The user would track this first target for a short amount of time (hereby known as the "testing duration", for the purposes of this example, we will assume each duration lasts for approximately 15.0 seconds), and during this period, the calibrator would internally monitor and calculate the accuracy percentage of the user's tracking attempt at step 1106 shown in FIG. 12.

Once the testing duration has expired, the calibrator would momentarily halt monitoring accuracy and will automatically lower the sensitivity setting, at step 1108, in the calibration software by a small increment. For the purposes of this example, we will assume that the initial mouse DPI was 800.0, and that the user had originally set the sensitivity in the calibrator to 4.0, which gives us an eDPI of 3200.0. Now that the calibrator is lowering the sensitivity, the sensitivity would change to 3.99 (which would give us an eDPI 3192). Once this has been done, the calibrator resumes monitoring of the tracking accuracy of the user. The user would track the first target again while holding down the fire button, and during this, the calibrator would internally monitor and calculate the accuracy percentage of the user's tracking attempt.

Once the testing duration has expired, the calibrator would momentarily halt monitoring accuracy, and the calibrator would determine whether the tracking was more accurate at the initial sensitivity value (4.0) or at the first lowered increment sensitivity value (3.99) at step 1110 of FIG. 12. If the lower sensitivity were more accurate, the calibrator sets the sensitivity another increment lower to 3.98, at step 1116 of FIG. 12, and the testing would begin again. The calibrator would then compare the accuracy of testing with the new sensitivity setting (3.98) to the accuracy at the most recent sensitivity setting (3.99) at step 1120 of FIG. 12, and if the accuracy percentage had improved, the calibrator would automatically set the sensitivity another increment lower to 3.97 at step 1116, and the testing would begin again at step 1120. This would continue until the testing results indicate that the accuracy percentage had worsened when compared to the test just before it, at step 1128 of FIG. 12.

If accuracy had improved at every incremental reduction of sensitivity setting from 4.0 to 3.91, but the accuracy percentage had decreased, once the sensitivity setting was reduced further to 3.90, the calibrator would adjust the sensitivity setting back to where it had been the most accurate, 3.91 sensitivity, at step 1132 of FIG. 12, (which results in an eDPI of 3128.0). The calibrator would then display the current most optimal tested sensitivity value for the close target (3.91) as text, labeled "close application sensitivity".

Please note that at the original sensitivity comparison for close range targets at 4.0 and 3.99, if the higher sensitivity had been more accurate at step 1114 of FIG. 12, the calibrator would have then set the sensitivity one increment higher at step 1118 (instead of in the previous case, where it was set lower) than the initial sensitivity (to 4.01) and the testing would have begun again at step 1124. This calibrator would have continued adjusting the sensitivity setting higher until the testing results would indicate that the accuracy percentage had worsened when compared to the test just before it, at step 1130 of FIG. 12. If accuracy had improved on the close range target at every incremental sensitivity setting from 4.0 to 4.09, but the accuracy percentage had decreased once the sensitivity setting was increased further to 4.10, the calibrator would adjust the sensitivity setting back to where it had been the most accurate, 4.09.

In summary, when the calibrator compared the tracking accuracy at the two original sensitivity values of 4.0 and 3.99, it would determine if the higher or lower sensitivity value had produced the better result. If the higher value had been better, the calibrator would have then continued raising the sensitivity between testing durations, but if the lower value had been better, it would have instead continued lowering the sensitivity between testing durations. The calibrator would have continued doing this until it had determined that the accuracy values had begun to worsen. It would have then set the close application sensitivity to whatever sensitivity value that had produced the highest measured accuracy.

Now that the close application sensitivity value has been determined at step 1132 of FIG. 12, the sensitivity setting in the calibrator would temporarily remain at this current most optimal tested sensitivity value (3.91), and the user would be instructed (such as visually through computer monitor 4 or through an audio message, to hold down the fire button and begin tracking the far range target. The user would track this second target for the testing duration, and the calibrator would internally monitor and calculate the accuracy percentage of the user's tracking attempt. The calibrator would then lower the sensitivity setting one increment (3.90) and the tracking on the far range target would begin again for the testing duration. Once the testing duration expires, the calibrator would compare the tracking accuracy between the two sensitivity values that were used for the far range target (3.91 and 3.90).

If the lower sensitivity setting (3.90) produced the best accuracy percentage, the calibrator would lower the sensitivity again and then test tracking. These two steps would continue to be done until the calibrator determines that lowering the sensitivity worsens tracking accuracy. When this happens, the calibrator would adjust the sensitivity setting back to where it had been the most accurate. For this example, we will say that optimal accuracy for the far range target was determined to be 3.78 sensitivity (resulting in an eDPI of 3024.0). The calibrator would then display the current most optimal tested sensitivity value for the far target (3.78) as text, labeled "far application sensitivity".

(Please note that at the original sensitivity comparison for far range targets at 3.90 and 3.91, if the higher sensitivity had been more accurate, the calibrator would have set the sensitivity one increment above the highest of the two far application sensitivity settings being tested (to 3.92) and the testing would have begun again. This calibrator would have continued to adjust the sensitivity setting higher until the testing results would indicate that the accuracy percentage had worsened when compared to the test just before it. If accuracy had improved on the far range target at every incremental sensitivity setting from 3.91 to 4.19, but the accuracy percentage had decreased at 4.20, the calibrator would adjust the sensitivity setting back to where it had been the most accurate, 4.19.)

The calibrator would now compare the close application sensitivity and the far application sensitivity to determine the "approximate converged sensitivity". If the close application sensitivity value is greater than the far application sensitivity value, then the far application sensitivity value is subtracted from the close application sensitivity value. The resulting difference is then subtracted from the far application sensitivity value to obtain the approximate converged sensitivity value. For example, if the close application sensitivity value is 3.75 and the far application sensitivity value is 3.47, the difference is 0.28. This difference subtracted from the far application sensitivity value of 3.47 would produce a value of 3.19. This means that the approximate converged sensitivity value is 3.19.

If the comparison of the close application sensitivity value and the far application sensitivity value had resulted in a far application sensitivity value that was greater than the close application sensitivity value, then instead the close application sensitivity value would be subtracted from the far application sensitivity value. The resulting difference would then be added to the far application sensitivity value to obtain the approximate converged sensitivity value. For example, if the close application sensitivity value is 3.35 and the far application sensitivity value is 3.57, the difference is 0.22. This difference added to the close application sensitivity value of 3.57 would produce a value of 3.79. This means that the approximate converged sensitivity value is 3.79.

If the comparison of the close application sensitivity value and the far application sensitivity value had indicated that both are the same, then both values would be the same as the approximate converged sensitivity. No additional calculations would be required in this instance.

At this point, the input surface support 16 will need to be adjusted to optimize its angle. Which direction the angle needs to be adjusted will depend on whether, in the previous comparison, the close application sensitivity had the greatest value, or the far application sensitivity had the greatest value.

If the close application sensitivity was originally greater, this indicates that the "front surface edge" such as any of 12a, 416, 516, 614, 714 of the input surface support such as any of 16, 606, 706 as it relates to the user is too high, and the front surface edge such as any of 12a, 416, 516, 614, 714 needs to be lowered to optimize the angle. If the far application sensitivity was originally greater, this indicates that the front surface edge 12a of the input surface support 16 as it relates to the user is too low, and the front surface edge 12a needs to be raised to optimize the angle. If the close application sensitivity and far application sensitivity were already the same value (which is extremely unlikely), no angle adjustments need to be made.

How the input surface support 12a is raised or lowered is determined by which version of the invention is being used. There are two different main versions of the invention, and these will be referred to as "basic" and "professional" versions, with details of the differences of each version provided.

The first version of the invention is described as the basic version. In this version, the device is at its simplest form; it is not motorized and there is no direct connectivity between the invention and the computer. The user will place shims 708 and 718 of FIG. 8 underneath the left and right side edges of the input surface support 706 of FIG. 8, near the front surface edge 714 of FIG. 8. When the calibrator instructs the user to raise or lower the front surface edge 714, the user will move the shims 708 and 718. The initial movements of the shims 708 and 718 will be such that the distance would be in measurements of approximately one centimeter, but once high accuracy numbers have been obtained, the final adjustments will be in tiny increments of less than a millimeter.

As the position of the shims 708 and 718 is changed, the degree of the angle of the input surface support 706 also changes. Please note that the imaginary dividing line that exists on the input surface support 706 halfway between the front surface edge 714 and the rear surface edge 702 is an extremely important reference point when making adjustments to the position of the shims 708 and 718. The movement of the shims 708 and 718 in one particular direction would either have the effect of raising or lowering the front surface edge 714, depending on whether the shims 708 and 718 are on the "front half" (the side that is closest to the user) of the input surface support 706, or on the "rear half" (the side that is farthest from the user).

For reference, moving the shims 708 and 718 away from the user will be described as "upwards", and moving the shims 708 and 718 towards the user will be described as "downwards". If the shims 708 and 718 are located at the front half, and the user moves them upwards (which would be towards the center of the input surface support 706), this would have the effect of raising the front surface edge 714. If the shims 708 and 718 are located at the front half, and the user moves them downwards (which would be away from the center of the input surface support 706), this would have the effect of lowering the front surface edge 714.

If the shims 708 and 718 are located at the rear half, and the user moves them upwards (which would be away from the center of the input surface support 706), this would have the effect of lowering the rear surface edge 702. If the shims 708 and 718 are located at the rear half, and the user moves them downwards (which would be towards the center of the input surface support 706), this would have the effect of raising the rear surface edge 702.

If the front surface edge 714 ever reaches a point where it physically cannot be lowered any further, but the calibrator indicates that it still needs additional lowering, then the "rear surface edge" 702 will be raised instead. (Raising the rear surface edge 702 has a similar effect on the input surface support angle as lowering the front surface edge 714. This lowers the degree of the angle of the input surface support 706 as it relates to the user.)

By the same token, if the front surface edge 714 ever reaches a point where it physically cannot be raised any further, but the calibrator indicates that it still needs additional raising, then the rear surface edge 702 will be lowered instead. (Lowering the rear surface edge 702 has a similar effect on the input surface support angle as raising the front surface edge 714. This increases the degree of the angle of the input surface support 706 as it relates to the user)

After the user has made a change in the position of the shims 708 and 718, the user will begin tracking the targets in the calibrator again, swapping between targets as the calibrator instructs. The calibrator will continue to prompt the user to either raise or lower the front surface edge 714.

This process will continue until the highest accuracy is measured while tracking both the close range target and the far range target. After this has occurred, the user will slightly pull one of the shims 708 or 718 horizontally away from the center of the input surface support 706 ("outward") and test accuracy again. In the instance that accuracy had increased, the user would continue to pull the shim 708 or 718 outward in small increments and test accuracy until it is determined that accuracy decreases. In the instance that accuracy had instead decreased, the user would push the shim 708 or 718 towards the center of the input surface support 706 ("inward") in small increments and test accuracy until it is determined that accuracy decreases. In either instance, when accuracy no longer increases, and begins to decrease, the shim 708 or 718 should be moved back to the position which produced the highest tracking accuracy result.

For reference, please note that moving the shims 708 and 718 upwards or downwards affects the angle of the input surface support 706 as it relates to the Y axis, or the "front to back" angle of the surface, which could be described as leaning the input surface support 706 toward or away from the user. Also, moving the shims 708 and 718 outwards or inwards affects the angle of the input surface support 714 as it relates to the X axis, or the "left to right" angle of the surface, which could be described as leaning the input surface support 706 leftward or rightward from the user. Tracking accuracy must be tested after every adjustment to the angles for both the X axis and Y axis to ensure that the most optimal angles have been found so that the most precise aim possible has been achieved.

The second version of the invention is described as the professional version. In this version, as shown in FIG. 5, the invention is motorized and has direct connectivity to the computer that hosts the calibrator. Like the basic version, the professional version will also use shims to raise or lower the input surface support, but there will be no prompts for the user to make these adjustments. The required movements will be handled automatically by the motors underneath the surface support. The calibrator will send commands directly to the motors, which will move the small platforms 410, 412, and 414 that the shims are attached to.

In at least one embodiment of the present invention, the member 16 of the device 14 may be a thin rigid board made of metal, tempered glass, or some similar material (which would be placed on table/desk surface 10) that has small boxes 18, 20, 22, and 24 on each of its four corners, as shown in FIG. 1. The boxes 18, 20, 22, and 24 may contain plastic shim wedges and motors that would move them according to how the computer software directed them. In at least one embodiment, the boxes 18, 20, 22, and 24 are connected to each other with a wire under the board 16, and are connected to the computer 2 and powered with a USB cable. The boxes 18, 20 22, and 24 may be connected to and communicate with the computer 2 and/or a computer processor of the computer 2, through hardwired connection or through wireless connection or other communication links. The input surface 12 may be made from a premium material such as textured leather or rubber, attached to the board 16. In at least one embodiment, the boxes 18, 20, 22, and 24 contain small fans with vents that circulate air across the input surface 12, helping to disperse any moisture such as sweat. This aids in keeping the surface friction consistent.

In one or more embodiments of the present invention, computer software stored in the computer memory of the computer 2, and implemented by the computer processor of the computer 2, is configured to produce additional sensitivity settings, for improving accuracy of the pointing input device (computer mouse 8) accuracy on the computer screen 4 by creating an additional modifier which acts along with manufacturer pointing input device (computer mouse 8) DPI settings and manufacturer in computer software application sensitivities, which may be originally stored in the computer 2.

In one or more embodiments of the present invention, computer software stored in the computer memory of the computer 2, and implemented by the computer processor of the computer 2, uses a computer web camera (or equivalent) to capture information about the angles of the pointing input device 8, input surface 12, input surface support 16, desk surface 10, user's arm, and user's hand. The software analyzes this angle information and provides suggested angle changes on the computer screen 4.

Figure 14A:
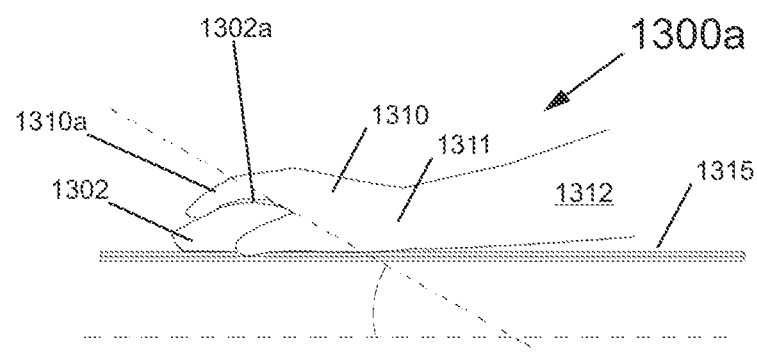
FIG. 14A shows a simplified diagram of a computer mouse with part of a human being's hand holding the mouse, and with a wrist and arm of the human being also being shown.

FIG. 14A shows a simplified diagram 1300a of a computer mouse 1302 with part of a human being's hand 1310 holding the mouse 1302, and with a wrist 1311 and arm 1312 of the human being also being shown. The mouse 1302 rests on an input surface 1315, which in FIG. 14A is situated so that it is parallel to a horizontal ground surface, though this may not always be the case in other instances that are not shown.

Figure 14B:
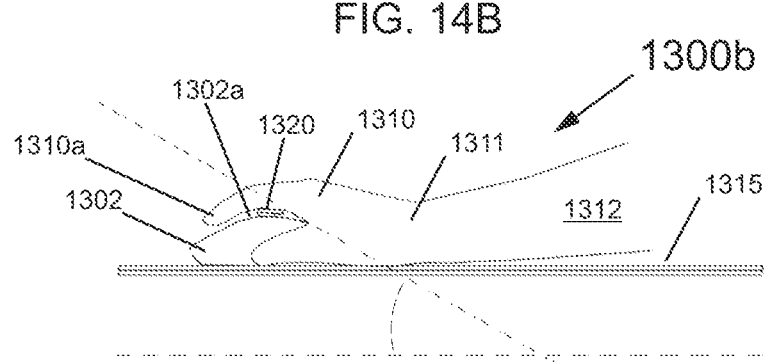
FIG. 14B shows a simplified diagram of the computer mouse of FIG. 14A with part of the human being's hand holding the mouse, and with the wrist and the arm of the human being also being shown as in FIG. 14A, but with the addition of a first means attached to the top of the computer mouse, which adjusts the angle of the hand, wrist, and/or one or more fingers of the hand with respect to a horizontal surface.

FIG. 14B shows a simplified diagram 1300b of the computer mouse 1302 with part of the human being's hand 1310 holding the mouse 1302, and with the wrist 1311 and the arm 1312 of the human being also being shown as in FIG. 14A, but with the addition of a first means 1320, which may include two stackable shims, attached to the top surface 1302a of the computer mouse 1302, which adjusts the angle of the hand 1310, wrist 1311, and/or one or more fingers of the hand 1310 with respect to a horizontal surface. In FIG. 14B, the input surface 1315 is parallel to a horizontal ground surface, though this may not always be the case in other instances that are not shown.

Figure 14C:
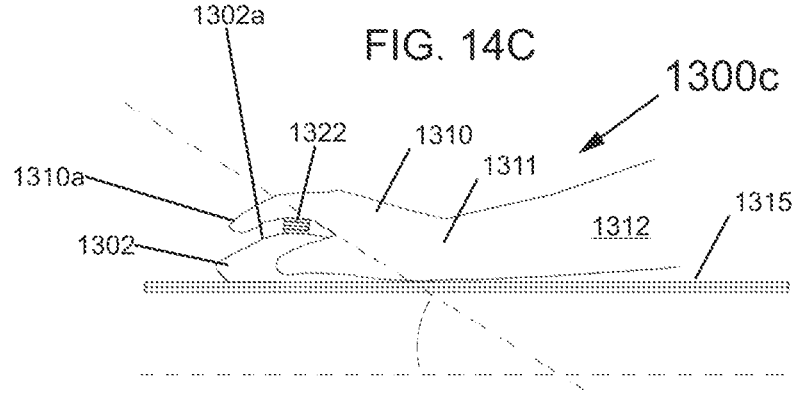
FIG. 14C shows a simplified diagram of the computer mouse of FIG. 14A with part of the human being's hand holding the mouse, and with the wrist and the arm of the human being also being shown as in FIG. 14A, but with the addition of a second means attached to the top of the computer mouse, which adjusts the angle of the hand, wrist, and/or one or more fingers of the hand with respect to a horizontal surface.

FIG. 14C shows a simplified diagram 1300c of the computer mouse 1302 with part of the human being's hand 1310 holding the mouse 1302, and with the wrist 1311 and the arm 1312 of the human being also being shown as in FIG. 14A, but with the addition of a second means 1322 attached to the top surface 1302a of the computer mouse 1302, which adjusts the angle of the hand 1310, wrist 1311, and/or one or more fingers, such as finger 1310a of the hand 1310 with respect to a horizontal surface. In FIG. 14C, the input surface 1315 is parallel to a horizontal ground surface, though this may not always be the case in other instances that are not shown.

FIG. 14A, FIG. 14B, and FIG. 14C all show the angles of a human hand (as it relates to a horizontal surface) being changed as the means 1320 and 1322 are introduced. Please note that though not explicitly shown as such in the images, these hand angles could also be expressed as being in relation to the input surface 1315, the ground surface, some other horizontal surface, or some other part of the user's body. Also note that the angle in FIG. 14A is smaller than the angle in FIG. 14B, which is smaller than the angle in FIG. 14C.

Figure 15A:
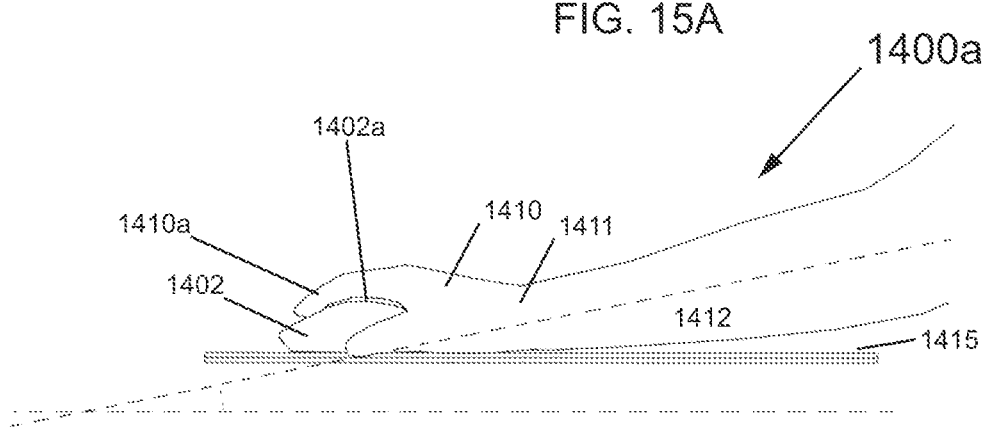
FIG. 15A shows a simplified diagram of a computer mouse with part of a human being's hand holding the mouse, and with a wrist and arm of the human being also being shown.

FIG. 15A shows a simplified diagram 1400a of a computer mouse 1402 with part of a human being's hand 1410 holding the mouse 1402, and with a wrist 1411 and arm 1412 of the human being also being shown. The mouse 1402 rests on an input surface 1415, which in FIG. 15A, is parallel to a horizontal ground surface, though this may not always be the case in other instances that are not shown.

Figure 15B:
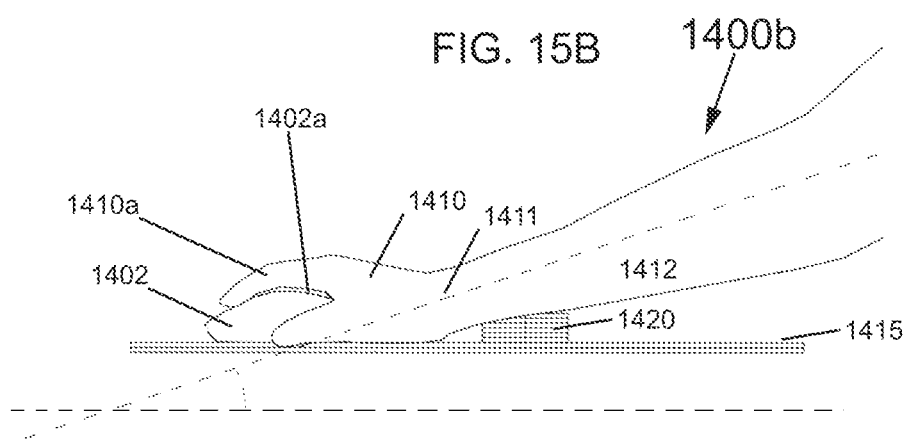
FIG. 15B shows a simplified diagram of the computer mouse of FIG. 15A with part of the human being's hand holding the mouse, and with the wrist and the arm of the human being also being shown as in FIG. 15A, but with the addition of a first means placed under the arm of the user which adjusts the angle of the arm with respect to a horizontal surface.

FIG. 15B shows a simplified diagram of the computer mouse 1402 of FIG. 15A with part of the human being's hand 1410 holding the mouse 1402, and with the wrist 1411 and the arm 1412 of the human being also being shown as in FIG. 15A, but with the addition of a first means 1420, which may include a plurality of stackable shims, being placed under the arm 1412 of the user which adjusts the angle of the arm 1412 with respect to a horizontal surface. In FIG. 15B, the input surface 1415 is parallel to a horizontal ground surface, though this may not always be the case in other instances that are not shown.

Figure 15C:
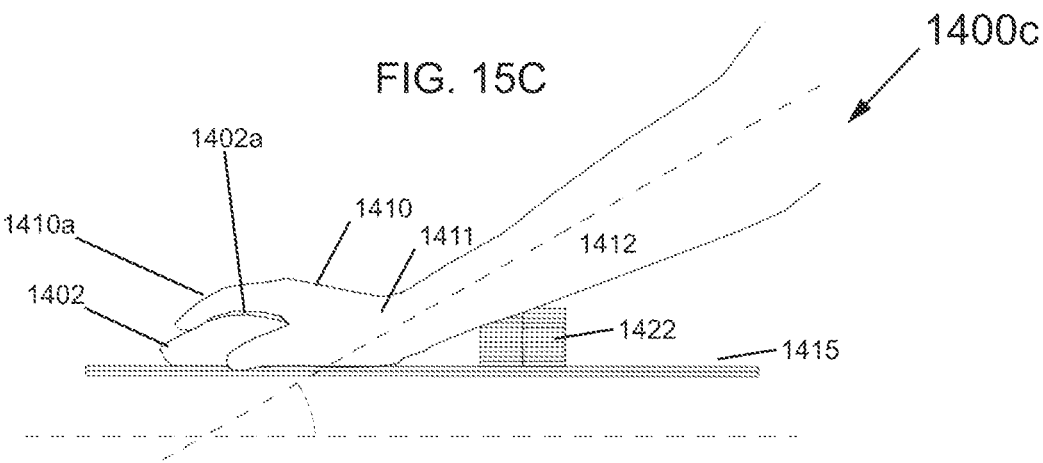
FIG. 15C shows a simplified diagram of the computer mouse of FIG. 15A with part of the human being's hand holding the mouse, and with the wrist and the arm of the human being also being shown as in FIG. 15A, but with the addition of a second means placed under the arm of the user which adjusts the angle of the arm with respect to a horizontal surface.

FIG. 15C shows a simplified diagram of the computer mouse 1402 of FIG. 15A with part of the human being's hand 1410 holding the mouse 1402, and with the wrist 1411 and the arm 1412 of the human being also being shown as in FIG. 15A, but with the addition of a second means 1422, including a plurality of shims placed under the arm 1412 of the user which adjusts the angle of the arm 1412 with respect to a horizontal surface. In FIG. 15C, the input surface 1415 is parallel to a horizontal ground surface, though this may not always be the case in other instances that are not shown.

FIG. 15A, FIG. 15B, and FIG. 15C all show the angles of a human forearm (as it relates to a horizontal surface) being changed as the means 1420 and 1422 are introduced. Please note that though not explicitly shown as such in the images, these forearm angles could also be expressed as being in relation to the input surface 1415, the ground surface, some other horizontal surface, or some other part of the user's body. Also note that the angle in FIG. 15A is smaller than the angle in FIG. 15B, which is smaller than the angle in FIG. 15C.

Figure 16A:
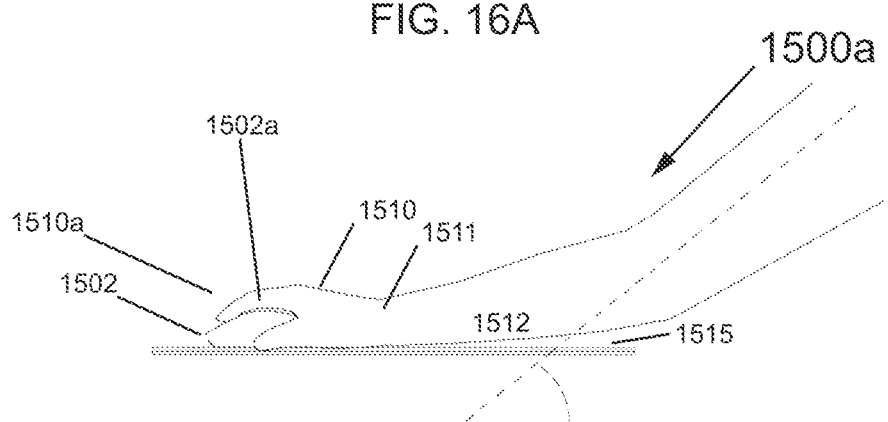
FIG. 16A shows a simplified diagram of a computer mouse with part of a human being's hand holding the mouse, and with a wrist and arm of the human being also being shown.

FIG. 16A shows a simplified diagram 1500*a* of a computer mouse 1502 with part of a human being's hand 1510 holding the mouse 1502, and with a wrist 1511 and arm 1512 of the human being also being shown. The input surface 1515, on which the mouse 1502 rests, is also shown. In FIG. 16A, the input surface 1515 is parallel to a horizontal ground surface, though this may not always be the case in other instances that are not shown.

Figure 16B:
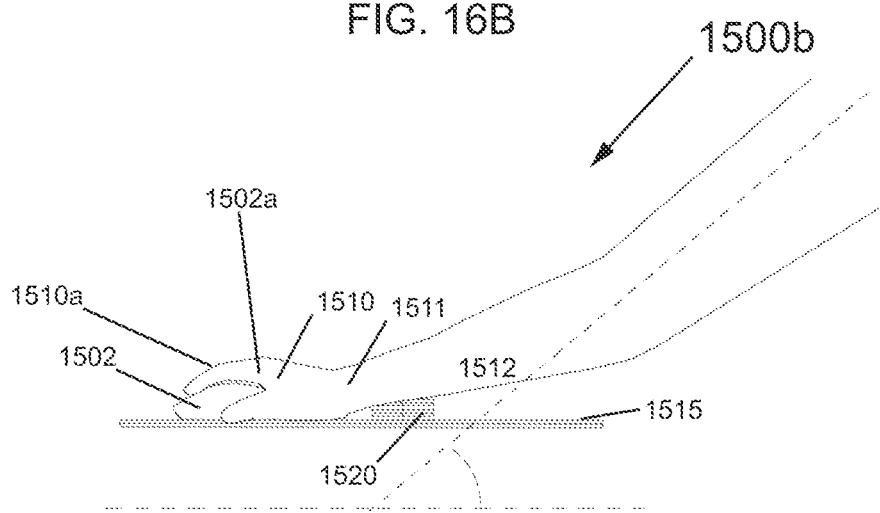
FIG. 16B shows a simplified diagram of the computer mouse of FIG. 16A with part of the human being's hand holding the mouse, and with the wrist and the arm of the human being also being shown as in FIG. 16A, but with the addition of a first means placed under the arm of the user which adjusts the angle of the arm with respect to a horizontal surface.

FIG. 16B shows a simplified diagram 1500*b* of the computer mouse 1502 of FIG. 16A with part of the human being's hand 1510 holding the mouse 1502, and with the wrist 1511 and the arm 1512 of the human being also being shown as in FIG. 16A, but with the addition of a first means 1520 placed under the arm 1512 of the user which adjusts the angle of the arm 1512 with respect to a horizontal surface. In FIG. 16B, the input surface 1515 is parallel to a horizontal ground surface, though this may not always be the case in other instances that are not shown.

Figure 16C:
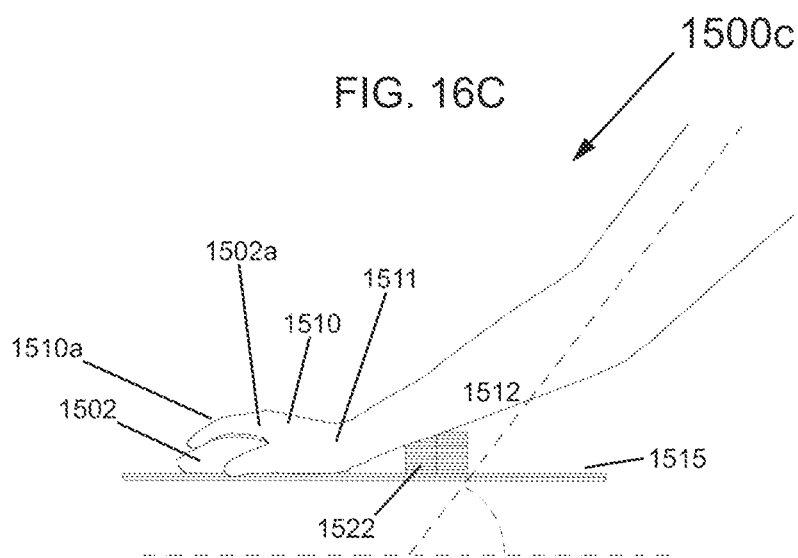
FIG. 16C shows a simplified diagram of the computer mouse of FIG. 16A with part of the human being's hand holding the mouse, and with the wrist and the arm of the human being also being shown as in FIG. 16A, but with the addition of a second means placed under the arm of the user which adjusts the angle of the arm with respect to a horizontal surface.

FIG. 16C shows a simplified diagram 1500*c* of the computer mouse 1502 of FIG. 16A with part of the human being's hand 1510 holding the mouse 1502, and with the wrist 1511 and the arm 1512 of the human being also being shown as in FIG. 16A, but with the addition of a second means 1522 placed under the arm 1512 of the user which adjusts the angle of the arm 1512 with respect to a horizontal surface. In FIG. 16C, the input surface 1515 is parallel to a horizontal ground surface, though this may not always be the case in other instances that are not shown.

FIG. 16A, FIG. 16B, and FIG. 16C all show the angles of an upper arm of a human (as it relates to a horizontal surface) being changed as the means 1520 and 1522 are introduced. Please note that though not explicitly shown as such in the images, these upper arm angles could also be expressed as being in relation to the input surface 1515, the ground surface, some other horizontal surface, or some other part of the user's body. Also note that the angle in FIG. 16A is smaller than the angle in FIG. 16B, which is smaller than the angle in FIG. 16C.

Figure 17A:
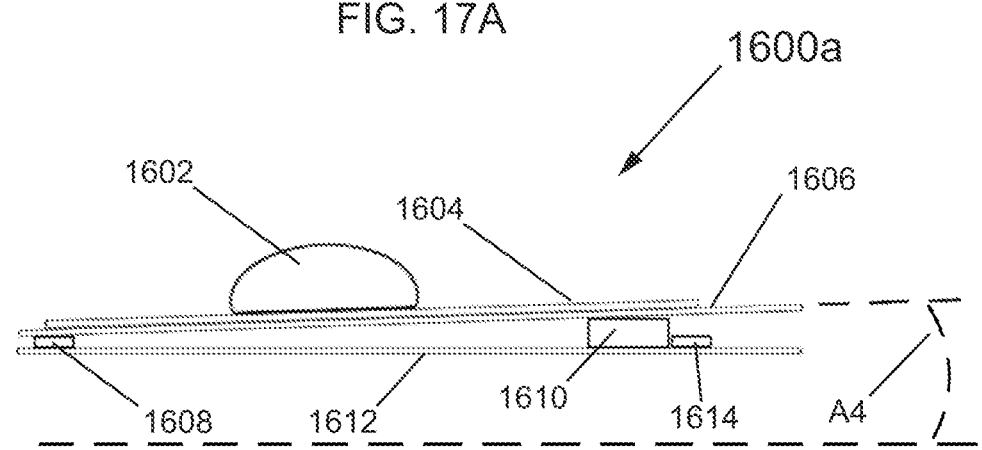
FIG. 17A shows a simplified diagram of a computer mouse with another means for adjusting the angle of the computer mouse with respect to a surface, wherein the means in FIG. 17A is placed towards the outside of a member.

FIG. 17A shows a simplified diagram 1600*a* of an apparatus including a computer mouse 1602 with another means for directly adjusting an input surface support, and indirectly adjusting the angle of the computer mouse 1602, with respect to a surface. The apparatus of diagram 1600*a* may include a mouse 1602, an input surface 1604, an input surface support 1606, rubber bumpers 1608 and 1614, a shim 1610, and a desk surface 1612. The mouse 1602 is shown at an angle of A4 with respect to a horizontal surface. In FIG. 17A, the desk surface 1612 is parallel to a horizontal ground surface, though this may not always be the case in other instances that are not shown.

Figure 17B:
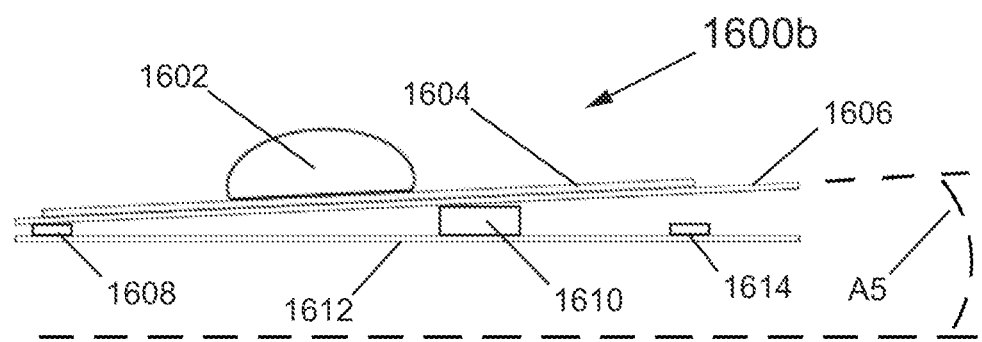
FIG. 17B shows a simplified diagram of a computer mouse with another means for adjusting the angle of the computer mouse with respect to a surface, wherein the means in FIG. 17B is placed more towards the middle of a member, than in FIG. 17A.

FIG. 17B shows a simplified diagram 1600*b* of an apparatus including the computer mouse 1602 with another means for directly adjusting an input surface support, and indirectly adjusting the angle of the computer mouse 1602, with respect to a surface. The apparatus of diagram 1600*b* may include the mouse 1602, the input surface 1604, the input surface support 1606, rubber bumpers 1608 and 1614, the shim 1610, and the desk surface 1612. The bottom surface of the mouse 1602, and surface 1606 are shown at an angle of A5 with respect to a horizontal surface. In FIG. 17B, the desk surface 1612 is parallel to a horizontal ground surface, though this may not always be the case in other instances that are not shown. In FIG. 17B, the shim 1610 has been slid more towards the center of member 1606 to cause an increase in angle, i.e. angle A5 in FIG. 17B is greater than angle A4 in FIG. 17A.

Figure 17C:
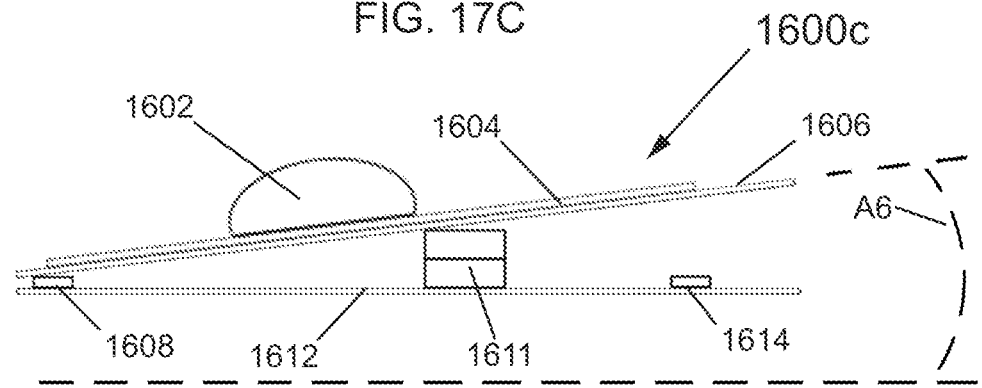
FIG. 17C shows a simplified diagram of a computer mouse with another means for adjusting the angle of the computer mouse with respect to a surface, wherein the means in FIG. 17C is placed more towards the middle of a member, than in FIG. 17A, and has a greater height than the mean in FIG. 17B.

FIG. 17C shows a simplified diagram 1600*c* of an apparatus including the computer mouse 1702 with another means for directly adjusting an input surface support, and indirectly adjusting the angle of the computer mouse 1602 (or the bottom surface of the computer mouse 1602), with respect to a surface. The apparatus of diagram 1600*c* may include the mouse 1602, the input surface 1604, the input surface support 1606, rubber bumpers 1608 and 1614, the shim 1610, and the desk surface 1612. The bottom surface of the mouse 1602, and surface 1606 are shown at an angle of A6 with respect to a horizontal surface. In FIG. 17C, the desk surface 1612 is parallel to a horizontal ground surface, though this may not always be the case in other instances that are not shown. In FIG. 17C, the shim 1610 has been replaced by shim 1611 which include two shims, and which has a greater height than shim 1610 of FIG. 17B, so that angle A6 in FIG. 17C is greater than angle A5 in FIG. 17B.

FIG. 17A, FIG. 17B, and FIG. 17C all show the angles of an input surface support 1606 (as it relates to a horizontal surface) being changed as the shims 1610 and 1611 are introduced and moved. Please note that though not explicitly shown as such in the images, these input surface support angles could also be expressed as being in relation to the input surface 1604, the ground surface, some other horizontal surface, or some part of the user's body.

Figure 18A:
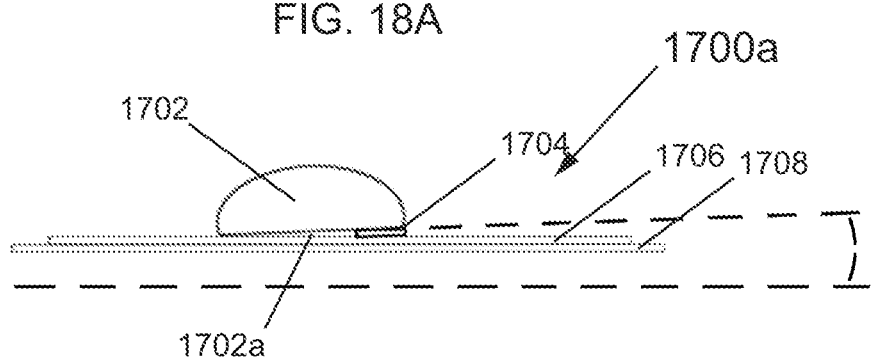
FIG. 18A is a simplified diagram of a computer mouse, with a first means of FIG. 18A for adjusting an angle of the computer mouse with respect to a surface.

FIG. 18A is a simplified diagram 1700*a* of a computer mouse 1702, with a first means 1704, which may be a shim, of FIG. 18A for adjusting an angle of a bottom surface 1702*a* of the computer mouse 1702 with respect to a horizontal surface. The input surface 1706 sits on a desk surface 1708. In FIG. 18A, the input surface 1706 and desk surface 1708 are both parallel to a horizontal ground surface, though this may not always be the case in other instances that are not shown.

Figure 18B:
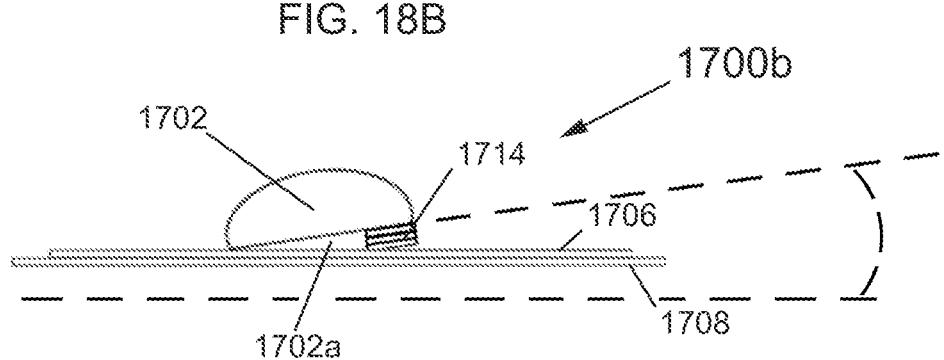
FIG. 18B is a simplified diagram of a computer mouse, with a second means of FIG. 18B for adjusting an angle of the computer mouse with respect to a surface.

FIG. 18B is a simplified diagram 1700*b* of a computer mouse 1702, with a second means 1714, which may be a shim of combination of shims (having a greater height than the means 1704 in FIG. 18A), of FIG. 18B for adjusting an angle of a bottom surface 1702a of the computer mouse 1702 with respect to a horizontal surface. The angle in FIG. 18B is greater than the angle in FIG. 18A. The input surface 1706 sits on a desk surface 1708. In FIG. 18B, the input surface 1706 and desk surface 1708 are both parallel to a horizontal ground surface, though this may not always be the case in other instances that are not shown.

Figure 18C:
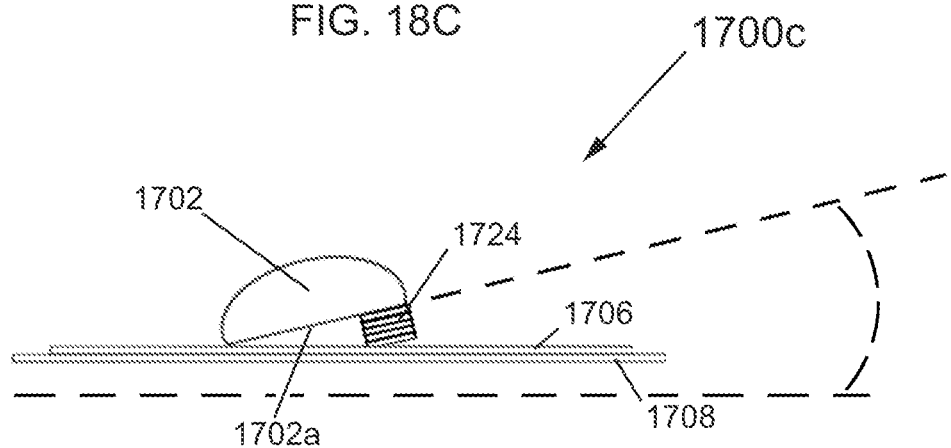
FIG. 18C is a simplified diagram of a computer mouse, with a second means of FIG. 18C for adjusting an angle of the computer mouse with respect to a surface.

FIG. 18C is a simplified diagram 1700c of a computer mouse 1702, with a third means 1724, which may be a shim of combination of shims (having a greater height than the means 1704 in FIG. 18A and a greater height that the means 1714 in FIG. 18B), of FIG. 18B for adjusting an angle of a bottom surface 1702a of the computer mouse 1702 with respect to a horizontal surface. The angle in FIG. 18C is greater than the angle in FIG. 18A or the angle in FIG. 18B. The input surface 1706 sits on a desk surface 1708. In FIG. 18C, the input surface 1706 and desk surface 1708 are both parallel to a horizontal ground surface, though this may not always be the case in other instances that are not shown.

FIG. 18A, FIG. 18B, and FIG. 18C all show the angles of a pointing input device 1702 (as it relates to a horizontal surface) being changed as the shims 1704, 1714, and 1724 are introduced. Please note that though not explicitly shown as such in the images, these pointing input device angles could also be expressed as being in relation to the input surface 1706, the ground surface, some other horizontal surface, or some part of the user's body.

Figure 19A:
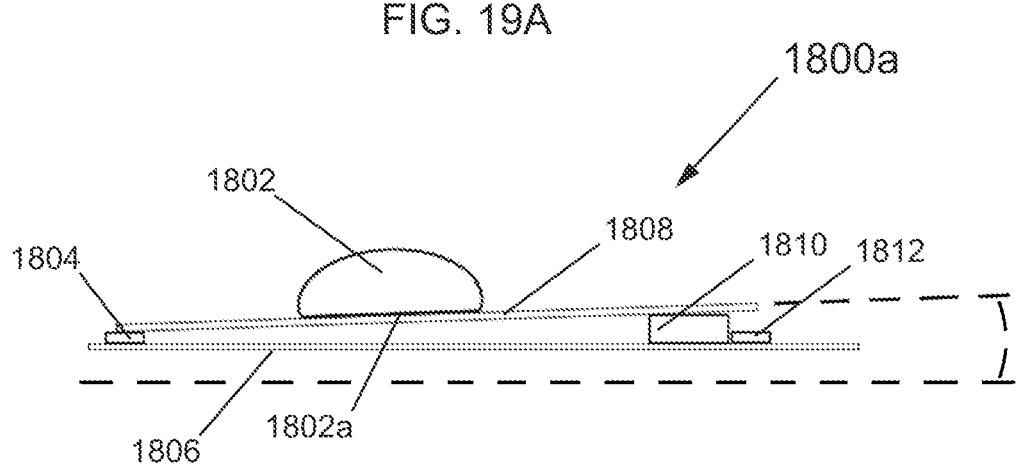
FIG. 19A is a simplified diagram of a computer mouse with a first means of FIG. 19A for adjusting the angle of the computer mouse with respect to a surface.

FIG. 19A is a simplified diagram 1800a of a computer mouse 1802, with a first means 1810, which may be a shim, of FIG. 19A for directly adjusting an input surface 1808 that is rigid, and indirectly adjusting an angle of a bottom surface 1802a of the computer mouse 1802, with respect to a horizontal surface. The diagram 1800a shows rubber bumper 1804, an input surface 1808 that is rigid, desk surface 1806, rubber bumper 1812, as well as shim 1810. In FIG. 19A, the desk surface 1806 is parallel to a horizontal ground surface, though this may not always be the case in other instances that are not shown.

Figure 19B:
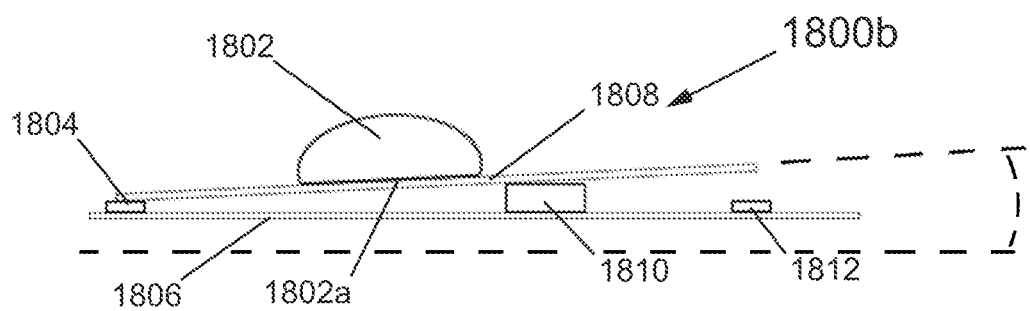
FIG. 19B is a simplified diagram of a computer mouse with a second means of FIG. 19B for adjusting the angle of the computer mouse with respect to a surface.

FIG. 19B is a simplified diagram 1800b of a computer mouse 1802, with a second means 1810, which may be a shim, of FIG. 19B for directly adjusting an input surface 1808 that is rigid, and indirectly adjusting an angle of a bottom surface 1802a of the computer mouse 1802, with respect to a horizontal surface. The diagram 1800B shows rubber bumper 1804, input surface 1808 that is rigid, desk surface 1806, rubber bumper 1812, as well as shim 1810. In FIG. 19B the shim 1810 has been moved more towards the center of the surface 1808, on which the mouse 1802 rests, in order to increase the angle of the bottom surface 1802a of the mouse 1802 and the surface 1808, with respect to a horizontal surface. In FIG. 19B, the desk surface 1806 is parallel to a horizontal ground surface, though this may not always be the case in other instances that are not shown. The angle in FIG. 19A is less than the angle in FIG. 19B.

Figure 19C:
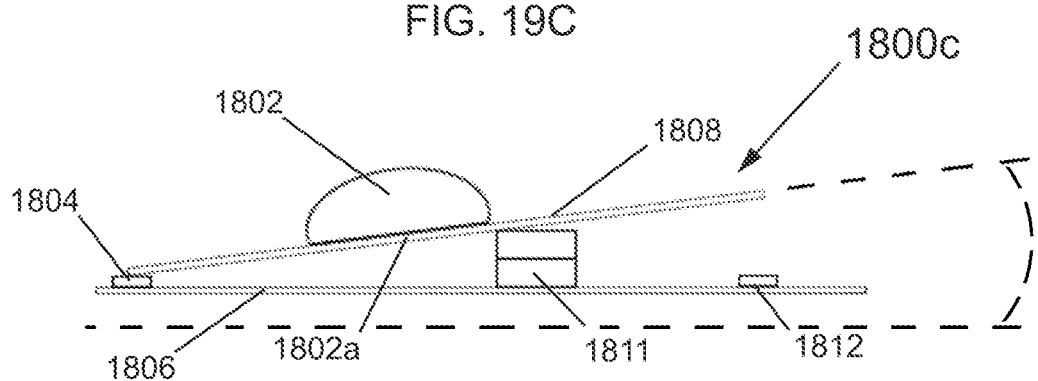
FIG. 19C is a simplified diagram of a computer mouse with a third means of FIG. 19C for adjusting the angle of the computer mouse with respect to a surface.

FIG. 19C is a simplified diagram 1800c of a computer mouse 1802, with a second means 1811, which may be a shim or combination of shims (which has a greater height than the height of shim 1810 in FIG. 19B), of FIG. 19C for directly adjusting an input surface 1808 that is rigid, and indirectly adjusting an angle of a bottom surface 1802a of the computer mouse 1802, with respect to a horizontal surface. The diagram 1800C shows rubber bumper 1804, input surface 1808 that is rigid, desk surface 1806, rubber bumper 1812, as well as shim 1811. In FIG. 19C the shim 1811 is more towards the center of the surface 1808, on which the mouse 1802 rests, in order to increase the angle of the bottom surface 1802a of the mouse 1802 and the surface 1808, with respect to the horizontal surface. In FIG. 19C, the desk surface 1806 is parallel to a horizontal ground surface, though this may not always be the case in other instances that are not shown. The angle in FIG. 19A is less than the angle in FIG. 19B, which is less than the angle in FIG. 19C.

FIG. 19A, FIG. 19B, and FIG. 19C all show the angles of an input surface 1808 (as it relates to a horizontal surface) being changed as the shims 1810 and 1811 are introduced and moved. Please note that though not explicitly shown as such in the images, these angles being changed could also be expressed as being in relation to the input surface support 1806, the ground surface, some other horizontal surface, or some part of the user's body.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising
a means for adjusting the angle of a horizontal surface with respect to a second horizontal surface; and
wherein a pointing input device relies on an input surface for the purpose of calculating cursor position; and the input surface is physically supported by the first horizontal surface;
wherein the means for adjusting the angle of the first horizontal surface with respect to the second horizontal surface include computer software stored in a computer memory, and implemented by a computer processor; and
wherein the computer software stored in the computer memory, and implemented by the computer processor provides suggested angle changes on the computer screen to improve input precision of the pointing input device.

2. The apparatus of claim 1 wherein
the computer software stored in the computer memory is configured to implement the suggested angle changes; and
wherein after suggested angle changes are implemented with the first horizontal surface, the computer software stored in the computer memory, and implemented by the computer processor enables a user, through a user interactive device, to determine what affect the angle suggested changes had on accuracy of the pointing input device, through data displayed on the computer screen.

3. The apparatus of claim 1 wherein
the computer software stored in the computer memory, and implemented by the computer processor generates targets at different positions on the computer screen.

4. The apparatus of claim 1 wherein
the computer software stored in the computer memory, and implemented by the computer processor produces additional sensitivity settings for improving accuracy of the pointing input device by creating an additional modifier to act along with manufacturer pointing input device DPI settings and manufacturer in-application sensitivities.

5. An apparatus comprising
a means for adjusting the angle of a horizontal surface with respect to a second horizontal surface; and
wherein a pointing input device relies on an input surface for the purpose of calculating cursor position; and the input surface is physically supported by the first horizontal surface;
wherein the means for adjusting the angle of the first horizontal surface with respect to the second horizontal surface include computer software stored in a computer memory, and implemented by a computer processor; and
the computer software stored in the computer memory, and implemented by the computer processor uses a range of computer software sensitivities and provides suggested angle changes on the computer screen to improve input precision of the pointing input device.

6. An apparatus comprising
a means for adjusting the angle of a desk surface with respect to a horizontal surface; and
wherein a pointing input device relies on an input surface for the purpose of calculating cursor position; and the desk surface physically supports the input surface,
wherein the means for adjusting the angle of the desk surface with respect to the horizontal surface include computer software stored in a computer memory, and implemented by a computer processor; and
wherein the computer software stored in the computer memory, and implemented by the computer processor provides suggested angle changes on the computer screen to improve input precision of the pointing input device.

7. The apparatus of claim 6 wherein
the computer software stored in the computer memory is configured to implement the suggested angle changes with the desk surface; and
wherein after suggested angle changes are implemented with the desk surface, the computer software stored in the computer memory, and implemented by the computer processor enables a user, through a user interactive device, to determine what affect the angle suggested changes had on accuracy of the pointing input device, through data displayed on the computer screen.

8. The apparatus of claim 6 wherein
the computer software stored in the computer memory, and implemented by the computer processor generates targets at different positions on the computer screen.

9. The apparatus of claim 6 wherein
the computer software stored in the computer memory, and implemented by the computer processor produces additional sensitivity settings for improving accuracy of the pointing input device by creating an additional modifier to act along with manufacturer pointing input device DPI settings and manufacturer in-application sensitivities.

10. An apparatus comprising
a means for adjusting the angle of a desk surface with respect to a horizontal surface; and
wherein a pointing input device relies on an input surface for the purpose of calculating cursor position; and the desk surface physically supports the input surface;
wherein the means for adjusting the angle of the desk surface with respect to the horizontal surface include computer software stored in a computer memory, and implemented by a computer processor; and
wherein
the computer software stored in the computer memory, and implemented by the computer processor uses a range of computer software sensitivities and provides suggested angle changes on the computer screen to improve input precision of the pointing input device.

* * * * *